United States Patent
Waltermire et al.

(10) Patent No.: US 11,072,486 B2
(45) Date of Patent: Jul. 27, 2021

(54) INSULATED BAG

(71) Applicant: Pratt Retail Specialties, LLC, Conyers, GA (US)

(72) Inventors: Jamie Waltermire, Peachtree City, GA (US); Paul Ott, Atlanta, GA (US)

(73) Assignee: Pratt Retail Specialties, LLC, Conyers, GA (US)

( * ) Notice: Subject to any disclaimer, the term of this patent is extended or adjusted under 35 U.S.C. 154(b) by 312 days.

(21) Appl. No.: 16/164,933

(22) Filed: Oct. 19, 2018

(65) Prior Publication Data
US 2019/0047775 A1 Feb. 14, 2019

Related U.S. Application Data

(62) Division of application No. 15/482,200, filed on Apr. 7, 2017, now Pat. No. 10,442,600.

(51) Int. Cl.
*B65D 81/38* (2006.01)
*A47J 41/00* (2006.01)
(Continued)

(52) U.S. Cl.
CPC ...... *B65D 81/3897* (2013.01); *A47J 41/0066* (2013.01); *B31B 70/26* (2017.08);
(Continued)

(58) Field of Classification Search
CPC ........ B65D 25/04; B65D 30/08; B65D 31/04; B65D 81/38; B65D 81/3893; B65D 81/3897; B31B 70/26
(Continued)

(56) References Cited

U.S. PATENT DOCUMENTS 265,985 A 10/1882 Seabury
1,527,167 A 2/1925 Birdseye
(Continued)

FOREIGN PATENT DOCUMENTS

CA 2019104 12/1991
CN 1503962 6/2004
(Continued)

OTHER PUBLICATIONS

US 10,562,676 B2, 02/2020, Waltermire et al. (withdrawn)
(Continued)

*Primary Examiner* — Nathaniel C Chukwurah
*Assistant Examiner* — Jacob A Smith
(74) *Attorney, Agent, or Firm* — Taylor English Duma LLP

(57) ABSTRACT

A method for assembling an insulated bag includes folding a first main panel of a pair of opposing main panels relative to a first side panel of a pair of opposing side panels about a main crease line, the main panels, the side panels, and the main crease line defined in an insulated blank, the insulated blank including an insulation batt, a first sheet, and a second sheet, the insulation batt encapsulated in a blank cavity defined between the first sheet and the second sheet, a blank border extending around a perimeter of the insulated blank, the insulated blank defining a first end and a second end; attaching the first end to the second end; and forming a bottom panel of the insulated bag by folding a portion of the bottom panel relative to the main panel about a bottom crease line.

14 Claims, 13 Drawing Sheets

(51) Int. Cl.
*B65D 25/04* (2006.01)
*B65D 33/02* (2006.01)
*B65D 33/06* (2006.01)
*B65D 33/16* (2006.01)
*B31B 70/26* (2017.01)
*B65D 33/12* (2006.01)
*B65D 33/08* (2006.01)

(52) U.S. Cl.
CPC .............. *B65D 25/04* (2013.01); *B65D 33/02* (2013.01); *B65D 33/06* (2013.01); *B65D 33/16* (2013.01); *B65D 81/389* (2013.01); *B65D 33/08* (2013.01); *B65D 33/12* (2013.01); *B65D 33/1691* (2013.01)

(58) Field of Classification Search
USPC .............................. 493/210; 383/37, 98, 110
See application file for complete search history.

(56) References Cited

U.S. PATENT DOCUMENTS

| | | | |
|---|---|---|---|
| 1,677,565 A | 7/1928 | Oppenheim | |
| 1,682,410 A | 8/1928 | Oppenheim | |
| 1,747,980 A | 2/1930 | Kondolf | |
| 1,753,813 A * | 4/1930 | Washburn | B65D 81/3886 383/21 |
| 1,868,996 A | 7/1932 | Sharp | |
| 1,896,393 A | 2/1933 | Devine | |
| 1,899,892 A * | 2/1933 | D Este | B65D 31/04 383/98 |
| 1,930,680 A | 10/1933 | Hinton | |
| 1,935,923 A | 11/1933 | Thoke | |
| 1,937,263 A * | 11/1933 | Bubb | B65D 81/3897 383/37 |
| 1,942,917 A | 1/1934 | D'Este et al. | |
| 1,954,013 A | 4/1934 | Lilienfield | |
| 2,018,519 A | 10/1935 | Hall | |
| 2,070,747 A | 2/1937 | Ostrom | |
| 2,116,513 A | 5/1938 | Frankenstein | |
| 2,148,454 A * | 2/1939 | Gerard | B65D 65/44 229/87.18 |
| 2,165,327 A | 7/1939 | Zalkind | |
| 2,289,060 A | 7/1942 | Merkle | |
| 2,293,361 A | 8/1942 | Roberts | |
| 2,360,806 A | 10/1944 | Van Rosen | |
| 2,386,905 A | 10/1945 | Meitzen | |
| 2,389,601 A | 11/1945 | De Witt | |
| 2,485,643 A * | 10/1949 | Norquist | B65D 7/08 52/796.12 |
| 2,554,004 A | 5/1951 | Bergstein | |
| 2,632,311 A | 3/1953 | Sullivan | |
| 2,650,016 A | 8/1953 | McMillan | |
| 2,753,102 A | 7/1956 | Paige | |
| 2,867,035 A | 1/1959 | Patterson, Jr. | |
| 2,899,103 A | 8/1959 | Ebert | |
| 2,927,720 A | 3/1960 | Adams | |
| 2,986,324 A | 5/1961 | Anderson, Jr. | |
| 2,987,239 A | 6/1961 | Atwood | |
| 3,029,008 A | 4/1962 | Membrino | |
| 3,031,121 A | 4/1962 | Chase | |
| 3,065,895 A | 11/1962 | Lipschutz | |
| 3,096,879 A | 7/1963 | Schumacher | |
| 3,097,782 A | 7/1963 | Koropatkin et al. | |
| 3,182,913 A | 5/1965 | Brian | |
| 3,193,176 A | 7/1965 | Gullickson et al. | |
| 3,194,471 A | 7/1965 | Murphy | |
| 3,222,843 A | 12/1965 | Schneider | |
| 3,236,206 A | 2/1966 | Willinger | |
| 3,282,411 A | 11/1966 | Jardine | |
| 3,286,825 A | 11/1966 | Laas | |
| 3,335,941 A | 8/1967 | Gatward | |
| 3,371,462 A | 3/1968 | Nordkvist et al. | |
| 3,375,934 A | 4/1968 | Bates | |
| 3,399,818 A | 9/1968 | Stegner | |
| 3,420,363 A | 1/1969 | Blickensderfer | |
| 3,435,736 A | 4/1969 | Reiche | |
| 3,465,948 A | 9/1969 | Boyer | |
| 3,503,550 A | 3/1970 | Main et al. | |
| 3,551,945 A | 1/1971 | Eyberg et al. | |
| 3,670,948 A | 6/1972 | Berg | |
| 3,703,383 A | 11/1972 | Kuchenbecker | |
| 3,734,336 A | 5/1973 | Rankow et al. | |
| 3,747,743 A | 7/1973 | Hoffman, Jr. | |
| 3,749,299 A | 7/1973 | Ingle | |
| 3,836,044 A | 9/1974 | Tilp et al. | |
| 3,843,038 A | 10/1974 | Sax | |
| 3,880,341 A | 4/1975 | Bamburg et al. | |
| 3,887,743 A | 6/1975 | Lane | |
| 3,890,762 A | 6/1975 | Ernst et al. | |
| 3,980,005 A | 9/1976 | Buonaiuto | |
| 4,030,227 A | 6/1977 | Oftedahl | |
| 4,050,264 A | 9/1977 | Tanaka | |
| 4,068,779 A | 1/1978 | Canfield | |
| 4,091,852 A | 5/1978 | Jordan et al. | |
| 4,169,540 A | 10/1979 | Larsson et al. | |
| 4,211,267 A | 7/1980 | Skovgaard | |
| 4,213,310 A | 7/1980 | Buss | |
| 4,335,844 A | 6/1982 | Egli | |
| 4,342,416 A | 8/1982 | Philips | |
| 4,380,314 A | 4/1983 | Langston, Jr. et al. | |
| 4,396,144 A | 8/1983 | Gutierrez et al. | |
| 4,418,864 A | 12/1983 | Neilsen | |
| 4,488,623 A | 12/1984 | Linnell, II et al. | |
| 4,509,645 A * | 4/1985 | Hotta | A45C 11/20 206/545 |
| 4,679,242 A * | 7/1987 | Brockhaus | A45C 3/04 190/1 |
| 4,682,708 A | 7/1987 | Pool | |
| 4,797,010 A * | 1/1989 | Coelho | B65D 31/04 229/902 |
| 4,819,793 A * | 4/1989 | Willard | A45C 3/04 206/162 |
| 4,828,133 A | 5/1989 | Hougendobler | |
| 4,830,282 A | 5/1989 | Knight, Jr. | |
| 4,889,252 A | 12/1989 | Rockom et al. | |
| 4,930,903 A | 6/1990 | Mahoney | |
| 4,989,780 A | 2/1991 | Foote et al. | |
| 5,016,813 A | 5/1991 | Simons | |
| 5,020,481 A | 6/1991 | Nelson | |
| 5,062,527 A | 11/1991 | Westerman | |
| 5,094,547 A | 3/1992 | Graham | |
| 5,102,004 A | 4/1992 | Hollander et al. | |
| 5,154,309 A | 10/1992 | Wischusen, III et al. | |
| 5,158,371 A | 10/1992 | Moravek | |
| 5,165,583 A | 11/1992 | Kouwenberg | |
| 5,185,904 A | 2/1993 | Rogers et al. | |
| 5,226,542 A | 7/1993 | Boecker et al. | |
| 5,230,450 A * | 7/1993 | Mahvi | A45C 7/0045 190/108 |
| 5,263,339 A | 11/1993 | Evans | |
| 5,358,757 A | 10/1994 | Robinette et al. | |
| 5,372,429 A | 12/1994 | Beaver, Jr. et al. | |
| 5,417,342 A | 5/1995 | Hutchison | |
| 5,418,031 A | 5/1995 | English | |
| 5,441,170 A | 8/1995 | Bane, III | |
| 5,454,471 A | 10/1995 | Norvell | |
| 5,491,186 A | 2/1996 | Kean et al. | |
| 5,493,874 A | 2/1996 | Landgrebe | |
| 5,499,473 A | 3/1996 | Ramberg | |
| 5,505,810 A | 4/1996 | Kirby et al. | |
| 5,511,667 A | 4/1996 | Carder | |
| 5,512,345 A | 4/1996 | Tsutsumi et al. | |
| 5,516,580 A | 5/1996 | Frenette et al. | |
| 5,562,228 A | 10/1996 | Ericson | |
| 5,573,119 A | 11/1996 | Luray | |
| 5,596,880 A | 1/1997 | Welker et al. | |
| 5,613,610 A | 3/1997 | Bradford | |
| 5,615,795 A | 4/1997 | Tipps | |
| 5,638,978 A | 6/1997 | Cadiente | |
| 5,775,576 A | 7/1998 | Stone | |
| 5,842,571 A | 12/1998 | Rausch | |
| 5,906,290 A | 5/1999 | Haberkorn | |
| 5,996,366 A | 12/1999 | Renard | |

(56) References Cited

U.S. PATENT DOCUMENTS

| | | | |
|---|---|---|---|
| 6,003,719 A | 12/1999 | Steward, III | |
| 6,041,958 A | 3/2000 | Tremelo | |
| 6,048,099 A * | 4/2000 | Muffett | A45C 11/20 |
| | | | 383/110 |
| 6,050,412 A | 4/2000 | Clough et al. | |
| 6,138,902 A | 10/2000 | Welch | |
| 6,164,526 A | 12/2000 | Dalvey | |
| 6,168,040 B1 | 1/2001 | Sautner et al. | |
| 6,220,473 B1 | 4/2001 | Lehman et al. | |
| 6,223,551 B1 | 5/2001 | Mitchell | |
| 6,238,091 B1 | 5/2001 | Mogil | |
| 6,244,458 B1 | 6/2001 | Frysinger et al. | |
| 6,247,328 B1 | 6/2001 | Mogil | |
| 6,295,830 B1 | 10/2001 | Newman | |
| 6,295,860 B1 | 10/2001 | Sakairi et al. | |
| 6,308,850 B1 | 10/2001 | Coom et al. | |
| 6,325,281 B1 | 12/2001 | Grogan | |
| 6,443,309 B1 | 9/2002 | Becker | |
| 6,453,682 B1 | 9/2002 | Jennings et al. | |
| 6,478,268 B1 | 11/2002 | Bidwell et al. | |
| 6,510,705 B1 | 1/2003 | Jackson | |
| 6,582,124 B2 | 6/2003 | Mogil | |
| 6,618,868 B2 | 9/2003 | Minnick | |
| 6,688,133 B1 | 2/2004 | Donefrio | |
| 6,725,783 B2 | 4/2004 | Sekino | |
| 6,726,017 B2 | 4/2004 | Maresh et al. | |
| 6,736,309 B1 | 5/2004 | Westerman et al. | |
| 6,771,183 B2 | 8/2004 | Hunter | |
| 6,821,019 B2 | 11/2004 | Mogil | |
| 6,837,420 B2 | 1/2005 | Westerman et al. | |
| 6,868,982 B2 | 3/2005 | Gordon | |
| 6,875,486 B2 | 4/2005 | Miller | |
| 6,899,229 B2 | 5/2005 | Dennison et al. | |
| 6,910,582 B2 | 6/2005 | Lantz | |
| 6,913,389 B2 * | 7/2005 | Kannankeril | B65D 31/10 |
| | | | 383/110 |
| 6,971,539 B1 | 12/2005 | Abbe | |
| 7,000,962 B2 | 2/2006 | Le | |
| 7,019,271 B2 | 3/2006 | Wnek et al. | |
| 7,070,841 B2 | 7/2006 | Benim et al. | |
| 7,094,192 B2 | 8/2006 | Schoenberger et al. | |
| 7,140,773 B2 | 11/2006 | Becker et al. | |
| 7,225,632 B2 | 6/2007 | Derifield | |
| 7,225,970 B2 | 6/2007 | Philips | |
| 7,229,677 B2 | 6/2007 | Miller | |
| 7,264,147 B1 | 9/2007 | Benson et al. | |
| 7,392,931 B2 | 7/2008 | Issler | |
| 7,452,316 B2 | 11/2008 | Cals et al. | |
| D582,676 S | 12/2008 | Rothschild | |
| 7,597,209 B2 | 10/2009 | Rothschild et al. | |
| 7,607,563 B2 | 10/2009 | Hanna et al. | |
| 7,677,406 B2 | 3/2010 | Maxson | |
| 7,681,405 B2 | 3/2010 | Williams | |
| 7,784,301 B2 | 8/2010 | Sasaki et al. | |
| 7,807,773 B2 | 10/2010 | Matsuoka et al. | |
| 7,841,512 B2 | 11/2010 | Westerman | |
| 7,845,508 B2 | 12/2010 | Rothschild et al. | |
| 7,870,992 B2 | 1/2011 | Schille et al. | |
| 7,909,806 B2 | 3/2011 | Goodman et al. | |
| 7,971,720 B2 | 7/2011 | Minkler | |
| 8,118,177 B2 | 2/2012 | Drapela et al. | |
| 8,209,995 B2 * | 7/2012 | Kieling | A45C 3/001 |
| | | | 62/457.1 |
| 8,210,353 B2 | 7/2012 | Epicureo | |
| 8,343,024 B1 | 1/2013 | Contanzo, Jr. et al. | |
| 8,365,943 B2 | 2/2013 | Bentley | |
| 8,465,404 B2 | 6/2013 | Hadley | |
| 8,579,183 B2 | 11/2013 | Belfort et al. | |
| 8,596,520 B2 | 12/2013 | Scott | |
| 8,613,202 B2 | 12/2013 | Williams | |
| 8,651,593 B2 | 2/2014 | Bezich et al. | |
| 8,763,811 B2 | 7/2014 | Lantz | |
| 8,763,886 B2 | 7/2014 | Hall | |
| 8,795,470 B2 | 8/2014 | Henderson et al. | |
| 8,919,082 B1 | 12/2014 | Cataldo | |
| 8,960,528 B2 | 2/2015 | Sadlier | |
| 9,272,475 B2 | 3/2016 | Ranade et al. | |
| 9,290,313 B2 | 3/2016 | De Lesseux et al. | |
| 9,322,136 B2 | 4/2016 | Ostendorf et al. | |
| D758,182 S | 6/2016 | Sponselee | |
| 9,394,633 B2 | 7/2016 | Shimotsu et al. | |
| 9,408,445 B2 * | 8/2016 | Mogil | A45C 11/20 |
| 9,429,350 B2 | 8/2016 | Chapman, Jr. | |
| 9,499,294 B1 | 11/2016 | Contanzo, Jr. | |
| 9,550,618 B1 | 1/2017 | Jobe | |
| 9,605,382 B2 | 3/2017 | Virtanen | |
| 9,611,067 B2 | 4/2017 | Collison | |
| 9,635,916 B2 | 5/2017 | Bezich et al. | |
| 9,701,437 B2 | 7/2017 | Bugas et al. | |
| 9,738,420 B2 | 8/2017 | Miller | |
| 9,738,432 B1 | 8/2017 | Petrucci et al. | |
| 9,834,366 B2 | 12/2017 | Giuliani | |
| 9,908,680 B2 | 3/2018 | Shi et al. | |
| 9,908,684 B2 | 3/2018 | Collison | |
| 9,920,517 B2 | 3/2018 | Sollie | |
| 9,950,830 B2 | 4/2018 | De Lesseux et al. | |
| 9,981,797 B2 | 5/2018 | Aksan et al. | |
| 10,046,901 B1 | 8/2018 | Jobe | |
| 10,094,126 B2 | 10/2018 | Collison et al. | |
| 10,112,756 B2 | 10/2018 | Menzel, Jr. | |
| 10,226,909 B2 | 3/2019 | Frem et al. | |
| 10,266,332 B2 | 4/2019 | Aksan et al. | |
| 10,357,936 B1 | 7/2019 | Vincent et al. | |
| 10,442,600 B2 | 10/2019 | Waltermire et al. | |
| 10,507,968 B2 | 12/2019 | Sollie et al. | |
| 10,551,110 B2 | 2/2020 | Waltermire et al. | |
| 10,583,977 B2 | 3/2020 | Collison et al. | |
| 10,800,595 B2 | 10/2020 | Waltermire et al. | |
| 10,843,840 B2 | 11/2020 | Sollie et al. | |
| 10,858,141 B2 | 12/2020 | Sollie et al. | |
| 10,882,681 B2 | 1/2021 | Waltermire et al. | |
| 10,882,682 B2 | 1/2021 | Collison et al. | |
| 10,882,683 B2 | 1/2021 | Collison et al. | |
| 10,882,684 B2 | 1/2021 | Sollie et al. | |
| 10,926,939 B2 | 2/2021 | Collison et al. | |
| 10,941,977 B2 | 3/2021 | Waltermire et al. | |
| 10,947,025 B2 | 3/2021 | Sollie et al. | |
| 10,954,057 B2 | 3/2021 | Waltermire et al. | |
| 10,954,058 B2 | 3/2021 | Sollie et al. | |
| 2001/0010312 A1 | 8/2001 | Mogil | |
| 2002/0020188 A1 | 2/2002 | Sharon et al. | |
| 2002/0064318 A1 | 5/2002 | Malone et al. | |
| 2002/0162767 A1 | 11/2002 | Ohtsubo | |
| 2003/0145561 A1 | 8/2003 | Cals et al. | |
| 2004/0004111 A1 | 1/2004 | Cardinale | |
| 2004/0031842 A1 | 2/2004 | Westerman et al. | |
| 2004/0079794 A1 | 4/2004 | Mayer | |
| 2005/0109655 A1 | 5/2005 | Vershum et al. | |
| 2005/0117817 A1 * | 6/2005 | Mogil | A45C 7/0077 |
| | | | 383/110 |
| 2005/0189404 A1 | 9/2005 | Xiaohai et al. | |
| 2005/0214512 A1 | 9/2005 | Fascio | |
| 2005/0224501 A1 | 10/2005 | Folkert et al. | |
| 2005/0279963 A1 | 12/2005 | Church et al. | |
| 2006/0053828 A1 | 3/2006 | Shallman et al. | |
| 2006/0078720 A1 | 4/2006 | Toas et al. | |
| 2006/0096978 A1 | 5/2006 | Lafferty et al. | |
| 2006/0193541 A1 | 8/2006 | Norcom | |
| 2006/0243784 A1 | 11/2006 | Glaser et al. | |
| 2007/0000932 A1 | 1/2007 | Cron et al. | |
| 2007/0000983 A1 | 1/2007 | Spurrell et al. | |
| 2007/0051782 A1 | 3/2007 | Lantz | |
| 2007/0193298 A1 | 8/2007 | Derifield | |
| 2007/0209307 A1 | 9/2007 | Andersen | |
| 2007/0257040 A1 | 11/2007 | Price, Jr. et al. | |
| 2008/0095959 A1 | 4/2008 | Warner et al. | |
| 2008/0135564 A1 | 6/2008 | Romero | |
| 2008/0173703 A1 | 7/2008 | Westerman et al. | |
| 2008/0190940 A1 | 8/2008 | Scott | |
| 2008/0203090 A1 | 8/2008 | Dickinson | |
| 2008/0289302 A1 | 11/2008 | Vulpitta | |
| 2008/0296356 A1 | 12/2008 | Hatcher et al. | |
| 2008/0308616 A1 | 12/2008 | Phung | |
| 2008/0314794 A1 | 12/2008 | Bowman | |

(56) References Cited

U.S. PATENT DOCUMENTS

| | | | |
|---|---|---|---|
| 2009/0034883 A1* | 2/2009 | Giuliani | B65D 33/02 383/6 |
| 2009/0114311 A1 | 5/2009 | McDowell | |
| 2009/0193765 A1 | 8/2009 | Lantz | |
| 2009/0214142 A1 | 8/2009 | Bossel et al. | |
| 2009/0283578 A1 | 11/2009 | Miller | |
| 2009/0288791 A1 | 11/2009 | Hammer et al. | |
| 2010/0001056 A1 | 1/2010 | Chandaria | |
| 2010/0006630 A1 | 1/2010 | Humphries et al. | |
| 2010/0062921 A1 | 3/2010 | Veiseh | |
| 2010/0072105 A1 | 3/2010 | Glaser et al. | |
| 2010/0139878 A1 | 6/2010 | Clemente | |
| 2010/0151164 A1 | 6/2010 | Grant et al. | |
| 2010/0258574 A1 | 10/2010 | Bentley | |
| 2010/0270317 A1* | 10/2010 | Kieling | A45C 3/001 220/592.25 |
| 2010/0282827 A1 | 11/2010 | Padovani | |
| 2010/0284634 A1 | 11/2010 | Hadley | |
| 2010/0314397 A1 | 12/2010 | Williams et al. | |
| 2010/0314437 A1 | 12/2010 | Dowd | |
| 2011/0042449 A1 | 2/2011 | Copenhaver et al. | |
| 2011/0100868 A1 | 5/2011 | Lantz | |
| 2011/0114513 A1 | 5/2011 | Miller | |
| 2011/0235950 A1 | 9/2011 | Lin | |
| 2011/0284556 A1 | 11/2011 | Palmer et al. | |
| 2011/0311758 A1 | 12/2011 | Burns et al. | |
| 2011/0317944 A1 | 12/2011 | Liu | |
| 2012/0031957 A1 | 2/2012 | Whitaker | |
| 2012/0074823 A1 | 3/2012 | Bezich et al. | |
| 2012/0145568 A1 | 6/2012 | Collison et al. | |
| 2012/0243808 A1 | 9/2012 | De Lesseux et al. | |
| 2012/0248101 A1 | 10/2012 | Tumber et al. | |
| 2012/0251818 A1 | 10/2012 | Axrup et al. | |
| 2012/0279896 A1 | 11/2012 | Lantz | |
| 2013/0112694 A1 | 5/2013 | Bentley | |
| 2013/0112695 A1 | 5/2013 | Hall | |
| 2013/0140317 A1 | 6/2013 | Roskoss | |
| 2014/0000306 A1 | 1/2014 | Chapman, Jr. | |
| 2014/0021208 A1 | 1/2014 | Anti et al. | |
| 2014/0093697 A1 | 4/2014 | Perry et al. | |
| 2014/0248003 A1 | 9/2014 | Mogil et al. | |
| 2014/0319018 A1 | 10/2014 | Collison | |
| 2014/0367393 A1 | 12/2014 | Ranade | |
| 2015/0110423 A1 | 4/2015 | Fox et al. | |
| 2015/0166244 A1 | 6/2015 | Wood et al. | |
| 2015/0175338 A1 | 6/2015 | Culp et al. | |
| 2015/0238033 A1 | 8/2015 | Zavitsanos | |
| 2015/0239639 A1 | 8/2015 | Wenner et al. | |
| 2015/0259126 A1 | 9/2015 | McGoff et al. | |
| 2015/0284131 A1 | 10/2015 | Genender et al. | |
| 2015/0345853 A1 | 12/2015 | Oeyen | |
| 2016/0015039 A1 | 1/2016 | Pierce | |
| 2016/0052696 A1 | 2/2016 | Cook et al. | |
| 2016/0060017 A1 | 3/2016 | De Lesseux et al. | |
| 2016/0304267 A1 | 10/2016 | Aksan | |
| 2016/0325915 A1 | 11/2016 | Aksan | |
| 2017/0015080 A1 | 1/2017 | Collison et al. | |
| 2017/0043937 A1 | 2/2017 | Lantz | |
| 2017/0144792 A1 | 5/2017 | Block | |
| 2017/0198959 A1 | 7/2017 | Morris | |
| 2017/0225870 A1 | 8/2017 | Collison | |
| 2017/0233134 A9 | 8/2017 | Grajales et al. | |
| 2017/0283157 A1* | 10/2017 | Jobe | B65D 81/3862 |
| 2017/0305639 A1 | 10/2017 | Kuhn et al. | |
| 2017/0320653 A1 | 11/2017 | Mogil et al. | |
| 2017/0334622 A1 | 11/2017 | Menzel, Jr. | |
| 2017/0341847 A1 | 11/2017 | Chase et al. | |
| 2017/0361973 A1 | 12/2017 | Padilla | |
| 2017/0369226 A1 | 12/2017 | Chase et al. | |
| 2018/0050857 A1 | 2/2018 | Collison | |
| 2018/0051460 A1 | 2/2018 | Sollie et al. | |
| 2018/0148246 A1 | 5/2018 | Fu et al. | |
| 2018/0194534 A1 | 7/2018 | Jobe | |
| 2018/0215525 A1 | 8/2018 | Vogel et al. | |
| 2018/0229917 A1 | 8/2018 | Jobe | |
| 2018/0237207 A1 | 8/2018 | Aksan et al. | |
| 2018/0274837 A1 | 9/2018 | Christensen | |
| 2018/0290813 A1 | 10/2018 | Waltermire et al. | |
| 2018/0290815 A1 | 10/2018 | Waltermire et al. | |
| 2018/0299059 A1 | 10/2018 | McGoff et al. | |
| 2018/0327171 A1 | 11/2018 | Waltermire et al. | |
| 2018/0327172 A1 | 11/2018 | Waltermire et al. | |
| 2018/0334308 A1 | 11/2018 | Moore et al. | |
| 2018/0335241 A1 | 11/2018 | Li et al. | |
| 2019/0032991 A1 | 1/2019 | Waltermire et al. | |
| 2019/0185246 A1 | 6/2019 | Sollie et al. | |
| 2019/0185247 A1 | 6/2019 | Sollie et al. | |
| 2019/0193916 A1 | 6/2019 | Waltermire et al. | |
| 2019/0210790 A1 | 7/2019 | Rizzo et al. | |
| 2019/0234679 A1 | 8/2019 | Waltermire et al. | |
| 2019/0248573 A1 | 8/2019 | Collison et al. | |
| 2019/0270572 A1 | 9/2019 | Collison et al. | |
| 2019/0270573 A1 | 9/2019 | Collison et al. | |
| 2019/0352075 A1 | 11/2019 | Waltermire et al. | |
| 2019/0352076 A1 | 11/2019 | Waltermire et al. | |
| 2019/0352080 A1 | 11/2019 | Waltermire et al. | |
| 2019/0359412 A1 | 11/2019 | Sollie et al. | |
| 2019/0359413 A1 | 11/2019 | Sollie et al. | |
| 2019/0359414 A1 | 11/2019 | Sollie et al. | |
| 2019/0367209 A1 | 12/2019 | Jobe | |
| 2019/0376636 A1 | 12/2019 | Fellinger et al. | |
| 2019/0382186 A1 | 12/2019 | Sollie et al. | |
| 2019/0390892 A1 | 12/2019 | Waltermire et al. | |
| 2020/0088458 A1 | 3/2020 | Waltermire et al. | |
| 2020/0103159 A1 | 4/2020 | Waltermire et al. | |
| 2020/0122896 A1 | 4/2020 | Waltermire et al. | |
| 2020/0148409 A1 | 5/2020 | Sollie et al. | |
| 2020/0148410 A1 | 5/2020 | Sollie et al. | |
| 2020/0148453 A1 | 5/2020 | Sollie et al. | |
| 2020/0283188 A1 | 9/2020 | Sollie et al. | |
| 2020/0346816 A1 | 11/2020 | Sollie et al. | |
| 2020/0346841 A1 | 11/2020 | Sollie et al. | |
| 2021/0039869 A1 | 2/2021 | Waltermire et al. | |
| 2021/0039870 A1 | 2/2021 | Sollie et al. | |
| 2021/0039871 A1 | 2/2021 | Sollie et al. | |
| 2021/0070527 A1 | 3/2021 | Sollie et al. | |
| 2021/0070529 A1 | 3/2021 | Sollie et al. | |
| 2021/0070530 A1 | 3/2021 | Sollie et al. | |
| 2021/0101734 A1 | 4/2021 | Collison et al. | |
| 2021/0101735 A1 | 4/2021 | Collison et al. | |
| 2021/0101736 A1 | 4/2021 | Waltermire et al. | |
| 2021/0101737 A1 | 4/2021 | Waltermire et al. | |
| 2021/0102746 A1 | 4/2021 | Waltermire et al. | |
| 2021/0155367 A1 | 5/2021 | Sollie et al. | |
| 2021/0163210 A1 | 6/2021 | Waltermire et al. | |

FOREIGN PATENT DOCUMENTS

| | | |
|---|---|---|
| CN | 102264961 | 11/2011 |
| CN | 206494316 | 9/2017 |
| CN | 108001787 | 5/2018 |
| DE | 1897846 | * 7/1964 |
| DE | 102011016500 | 10/2012 |
| DE | 202017103230 | 7/2017 |
| DE | 202017003908 | 10/2017 |
| EP | 0133539 | 2/1985 |
| EP | 0537058 | 4/1993 |
| EP | 2990196 | 3/2016 |
| FR | 1241878 | 9/1960 |
| FR | 2705317 | 11/1994 |
| FR | 2820718 | 8/2002 |
| FR | 2821786 | 9/2002 |
| FR | 3016352 | 7/2015 |
| GB | 217683 | 6/1924 |
| GB | 235673 | 6/1925 |
| GB | 528289 | 1/1940 |
| GB | 713640 | 8/1954 |
| GB | 1204058 | 9/1970 |
| GB | 1305212 | 1/1973 |
| GB | 1372054 | 10/1974 |
| GB | 2400096 | 5/2006 |
| GB | 2516490 | 1/2015 |
| JP | 01254557 | 10/1989 |
| JP | 2005139582 | 6/2005 |

(56) References Cited

FOREIGN PATENT DOCUMENTS

| JP | 2005247329 | | 9/2005 |
|---|---|---|---|
| JP | 2012126440 | | 7/2012 |
| WO | 8807476 | | 10/1988 |
| WO | 9726192 | | 7/1997 |
| WO | 9932374 | | 7/1999 |
| WO | 2001070592 | | 9/2001 |
| WO | 2014147425 | | 9/2014 |
| WO | 2016187435 | A2 | 5/2016 |
| WO | 2016187435 | A3 | 11/2016 |
| WO | 2018089365 | | 5/2018 |
| WO | 2018093586 | | 5/2018 |
| WO | 2018227047 | | 12/2018 |
| WO | 2019125904 | | 6/2019 |
| WO | 2019125906 | | 6/2019 |
| WO | 2019226199 | | 11/2019 |
| WO | 2020101939 | | 5/2020 |
| WO | 2020102023 | | 5/2020 |
| WO | 2020122921 | | 6/2020 |
| WO | 2020222943 | | 11/2020 |

OTHER PUBLICATIONS

US 10,899,530 B2, 01/2021, Sollie et al. (withdrawn)
US 10,899,531 B2, 01/2021, Sollie et al. (withdrawn)
Waltermire, Jamie; Notice of Allowance for U.S. Appl. No. 15/482,186, filed Apr. 7, 2017, dated Mar. 5, 2020, 29 pgs.
Waltermire, Jamie; Non-Final Office Action for U.S. Appl. No. 16/293,716, filed Mar. 6, 2019, dated May 5, 2020, 70 pgs.
Waltermire, Jamie; Requirement for Restriction/Election for U.S. Appl. No. 16/293,716, filed Mar. 6, 2019, dated Feb. 26, 2020, 6 pgs.
Waltermire, Jamie; Non-Final Office Action for U.S. Appl. No. 16/526,555, filed Jul. 30, 2019, dated Apr. 2, 2020, 63 pgs.
Waltermire, Jamie; Advisory Action for U.S. Appl. No. 16/381,678, filed Apr. 11, 2019, dated Feb. 26, 2020, 3 pgs.
Waltermire, Jamie; Non-Final Office Action for U.S. Appl. No. 16/381,678, filed Apr. 11, 2019, dated Apr. 17, 2020, 30 pgs.
Waltermire, Jamie; Requirement for Restriction/Election for U.S. Appl. No. 16/561,203, filed Sep. 5, 2019, dated Feb. 26, 2020, 5 pgs.
Sollie, Greg; Restriction Requirement for U.S. Appl. No. 16/552,277, filed Aug. 27, 2019, dated Apr. 20, 2020, 7 pgs.
Sollie, Greg; Non-Final Office Action for U.S. Appl. No. 15/988,550, filed May 24, 2018, dated Mar. 11, 2020, 35 pgs.
Sollie, Greg; Final Office Action for U.S. Appl. No. 16/280,595, filed Feb. 20, 2019, dated Mar. 24, 2020, 20 pgs.
Sollie, Greg; Non-Final Office Action for U.S. Appl. No. 16/530,052, filed Aug. 2, 2019, dated Mar. 3, 2020, 24 pgs.
Sollie, Greg; Non-Final Office Action for U.S. Appl. No. 16/401,603, filed May 2, 2019, dated Mar. 10, 2020, 67 pgs.
Sollie, Greg; Final Office Action for U.S. Appl. No. 16/382,710, filed Apr. 12, 2019, dated Apr. 6, 2020, 33 pgs.
Sollie, Greg; Final Office Action for U.S. Appl. No. 16/408,981, filed May 10, 2019, dated Feb. 24, 2020, 29 pgs.
Waltermire, Jamie; Corrected Notice of Allowance for U.S. Appl. No. 15/482,186, filed Apr. 7, 2017, dated Jun. 2, 2020, 10 pgs.
Waltermire, Jamie; Applicant-Initiated Interview Summary for U.S. Appl. No. 16/526,511, filed Jul. 30, 2019, dated Jun. 12, 2020, 5 pgs.
Waltermire, Jamie; Final Office Action for U.S. Appl. No. 16/526,511, filed Jul. 30, 2019, dated May 19, 2020, 39 pgs.
Waltermire, Jamie; Non-Final Office Action for U.S. Appl. No. 16/526,511, filed Jul. 30, 2019, dated Jul. 10, 2020, 23 pgs.
Waltermire, Jamie; Applicant-Initiated Interview Summary for U.S. Appl. No. 16/530,045, filed Aug. 2, 2019, dated Jun. 15, 2020, 3 pgs.
Waltermire, Jamie; Non-Final Office Action for U.S. Appl. No. 16/530,045, filed Aug. 2, 2019, dated May 27, 2020, 38 pgs.
Waltermire, Jamie; Final Office Action for U.S. Appl. No. 16/381,678, filed Apr. 11, 2019, dated Jun. 16, 2020, 8 pgs.
Waltermire, Jamie; Non-Final Office Action for U.S. Appl. No. 16/561,203, filed Sep. 5, 2019, dated May 6, 2020, 59 pgs.
Sollie, Greg; Non-Final Office Action for U.S. Appl. No. 16/552,277, filed Aug. 27, 2019, mailed Jun. 3, 2020, 68 pgs.
Waltermire, Jamie; Non-Final Office Action for U.S. Appl. No. 15/590,349, filed May 9, 2017, dated Jun. 12, 2020, 30 pgs.
Collison, Alan B.; Applicant Interview Summary for U.S. Appl. No. 16/658,756, filed Oct. 21, 2019, dated May 6, 2020, 3 pgs.
Collison, Alan B.; Applicant Interview Summary for U.S. Appl. No. 16/658,756, filed Oct. 21, 2019, dated Jun. 29, 2020, 3 pgs.
Collison, Alan B.; Final Office Action for U.S. Appl. No. 16/658,756, filed Oct. 21, 2019, dated Jun. 17, 2020, 10 pgs.
Collison, Alan B.; Non-Final Office Action for U.S. Appl. No. 16/658,756, filed Oct. 21, 2019, dated Feb. 4, 2020, 14 pgs.
MP Global Products LLC: European Search Report for serial No. 17868605.1, dated Mar. 16, 2020, 7 pgs.
Collison, Alan B.; Non-Final Office Action for U.S. Appl. No. 16/414,309, filed May 16, 2019, dated Jul. 17, 2020, 77 pgs.
Collison, Alan B.; Requirement for Restriction/Election for U.S. Appl. No. 16/414,309, filed May 16, 2019, dated Jun. 16, 2020, 5 pgs.
Collison, Alan B.; Non-Final Office Action for U.S. Appl. No. 16/414,310, filed May 16, 2019, dated Jul. 8, 2020, 84 pgs.
Sollie, Greg; Advisory Action for U.S. Appl. No. 16/280,595, filed Feb. 20, 2019, dated Jul. 6, 2020, 3 pgs.
Sollie, Greg; Applicant-Initiated Interview Summary for U.S. Appl. No. 16/280,595, filed Feb. 20, 2019 dated May 6, 2020, 3 pgs.
Sollie, Greg; Applicant-Initiated Interview Summary for U.S. Appl. No. 16/401,603, filed May 2, 2019, dated May 15, 2020, 3 pgs.
Sollie, Greg; Final Office Action for U.S. Appl. No. 16/401,603, filed May 2, 2019, dated Jun. 30, 2020, 13 pgs.
Sollie, Greg; Notice of Allowance for U.S. Appl. No. 16/382,710, filed Apr. 12, 2019, dated Jun. 3, 2020, 12 pgs.
Sollie, Greg; Final Office Action for U.S. Appl. No. 16/567,192, filed Sep. 11, 2019, dated Jun. 8, 2020, 20 pgs.
Sollie, Greg; International Preliminary Report on Patentability for PCT Application No. PCT/US18/65459, filed Dec. 13, 2018, dated Jul. 2, 2020, 11 pgs.
Sollie, Greg; International Preliminary Report on Patentability for PCT Application No. PCT/US18/65461, filed Dec. 13, 2018, dated Jul. 2, 2020, 12 pgs.
Sollie, Greg; International Search Report and Written Opinion for PCT Application No. PCT/US20/24820, filed Mar. 26, 2020, dated Jul. 2, 2020, 14 pgs.
Sollie, Greg; International Search Report and Written Opinion for PCT Application No. PCT/US19/59764, filed Nov. 5, 2019, dated Jul. 1, 2020, 13 pgs.
Waltermire, Jamie; Corrected Notice of Allowance for U.S. Appl. No. 15/590,345, filed May 9, 2017, dated Feb. 18, 2020, 9 pgs.
Waltermire, Jamie; Supplemental Notice of Allowance for U.S. Appl. No. 15/590,345, filed May 9, 2017, dated Jan. 9, 2020, 8 pgs.
Waltermire, Jamie; Requirement for Restriction/Election for U.S. Appl. No. 16/526,555, filed Jul. 30, 2019, dated Jan. 17, 2020, 7 pgs.
Sollie, Greg; Non-Final Office Action for U.S. Appl. No. 15/845,540, filed Dec. 18, 2017, dated Feb. 19, 2020, 32 pgs.
Sollie, Greg; Applicant-Initiated Interview Summary for U.S. Appl. No. 16/530,052, filed Aug. 2, 2019, dated Feb. 5, 2020, 2 pgs.
Sollie, Greg; Requirement for Restriction/Election for U.S. Appl. No. 16/401,603, filed May 2, 2019, dated Feb. 18, 2020, 6 pgs.
Sollie, Greg; International Search Report and Written Opinion for PCT Application No. PCT/USI9/60486, filed Nov. 18, 2019, dated Jan. 13, 2020, 10 pgs.
Sollie, Greg; Invitation to Pay Additional Fees for PCT/US19/59764, filed Nov. 5, 2019, dated Jan. 2, 2020, 2 pgs.
Waltermire, Jamie; Final Office Action for U.S. Appl. No. 15/482,200, filed Apr. 7, 2017, dated Jan. 2, 2019, 23 pgs.
Waltermire, Jamie; Non-Final Office Action for U.S. Appl. No. 15/590,349, filed May 9, 2017, dated Nov. 5, 2018, 41 pgs.
Collison, Alan B.; Applicant Interview Summary for U.S. Appl. No. 15/677,738, filed Aug. 15, 2017, dated Dec. 5, 2018, 4 pgs.
Collison, Alan B.; Non-Final Office Action for U.S. Appl. No. 15/677,738, filed Aug. 15, 2017, dated Oct. 23, 2018, 11 pgs.
Periwrap; Article entitled: "Insulated Solutions", located at <https://www.peri-wrap.com/insulation/>, accessed on Dec. 3, 2018, 5 pgs.

(56) References Cited

OTHER PUBLICATIONS

Singh, et al; Article entitled: "Performance Comparison of Thermal Insulated Packaging Boxes, Bags and Refrigerants for Single-parcel Shipments", published Mar. 13, 2007, 19 pgs.
Waltermire, Jamie; Non-Final Office Action for U.S. Appl. No. 15/482,186, filed Apr. 7, 2017, dated Aug. 20, 2019, 81 pgs.
Waltermire, Jamie; Supplemental Notice of Allowance for U.S. Appl. No. 15/482,200, filed Apr. 7, 2017, dated Sep. 10, 2019, 8 pgs.
Waltermire, Jamie; Notice of Allowance for U.S. Appl. No. 15/590,345, filed May 9, 2017, dated Oct. 1, 2019, 28 pgs.
Waltermire, Jamie; Non-Final Office Action for U.S. Appl. No. 15/590,349, filed May 9, 2017, dated Sep. 5, 2019, 25 pgs.
Waltermire, Jamie; Final Office Action for U.S. Appl. No. 15/663,905, filed Jul. 31, 2017, dated Aug. 22, 2019, 23 pgs.
Waltermire, Jamie; Non-Final Office Action for U.S. Appl. No. 16/381,678, filed Apr. 11, 2019, dated Sep. 9, 2019, 50 pgs.
Sollie, Greg; Corrected Notice of Allowance for U.S. Appl. No. 15/845,545, filed Dec. 18, 2017, dated Oct. 1, 2019, 7 pgs.
"Green Cell Foam Shipping Coolers", located at <https://www.greencellfoam.com/shipping-coolers>, accessed on Oct. 18, 2019, 4 pgs.
CooLiner ® Insulated Shipping Bags, available at <http://www/chem-tran.com/packaging/supplies/cooliner-insulated-shipping-bags.php>, accessed on Oct. 18, 2019, 4 pgs.
Sollie, Greg; Final Office Action for U.S. Appl. No. 15/988,550, filed May 24, 2018, dated Aug. 14, 2019, 19 pgs.
Sollie, Greg; Non-Final Office Action for U.S. Appl. No. 15/988,550, filed May 24, 2018, dated Oct. 9, 2019, 17 pgs.
Sollie, Greg; Final Office Action for U.S. Appl. No. 16/280,595, filed Feb. 20, 2019, dated Oct. 3, 2019, 19 pgs.
Sollie, Greg; Non-Final Office Action for U.S. Appl. No. 16/530,052, filed Aug. 2, 2019, dated Oct. 2, 2019, 12 pgs.
Sollie, Greg; Non-Final Office Action for U.S. Appl. No. 16/382,710, filed Apr. 12, 2019, dated Oct. 10, 2019, 49 pgs.
Sollie, Greg; Non-Final Office Action for U.S. Appl. No. 16/408,981, filed May 10, 2019, dated Aug. 20, 2019, 50 pgs.
Waltermire, Jamie; Non-Final Office Action for U.S. Appl. No. 15/482,200, filed Apr. 7, 2017, dated Jun. 11, 2018, 36 pgs.
Waltermire, Jamie; Non-Final Office Action for U.S. Appl. No. 15/590,345, filed May 9, 2017, dated Aug. 24, 2018, 41 pgs.
Waltermire, Jamie; Requirement for Restriction/Election for U.S. Appl. No. 15/590,349, filed May 9, 2017, dated Aug. 30, 2018, 10 pgs.
Collison, Alan B.; Requirement for Restriction/Election for U.S. Appl. No. 15/677,738, filed Aug. 15, 2017, dated Jul. 3, 2018, 8 pgs.
Collison, Alan B.; Requirement for Restriction/Election for U.S. Appl. No. 15/677,738, filed Aug. 15, 2017, dated Jul. 31, 2018, 8 pgs.
American Bag Company; Article entitled: "Cool Green Bag, Small", located at <http://hotcoldbags.com/items/Cool%20Green%20Bag,%20Small>, accessed on Mar. 20, 2017, 2 pgs.
Cold Keepers; Article entitled: "Insulated Shipping Boxes—Coldkeepers, Thermal Shipping Solutions", located at <https://www.coldkeepers.com/product-category/shipping/>, (Accessed: Jan. 12, 2017), 3 pgs.
Duro Bag; Article entitled: "The Load and Fold Bag", accessed on May 24, 2017, copyrighted Apr. 2017, 3 pgs.
Greenblue; "Environmental Technical Briefs of Common Packaging Materials—Fiber-Based Materials", Sustainable Packaging Solution, 2009, 19 pgs.
Images of Novolex bag, including an outer paper bag, a corrugated cardboard insert, and an inner foil-covered bubble-wrap bag, publicly available prior to May 9, 2017, 7 pgs.
MP Global Products, LLC; International Search Report and Written Opinion of the International Searching Authority for PCT/US2017/060403, filed Nov. 7, 2017, dated Feb. 19, 2018, 15 pgs.
MP Global Products; Article entitled: "Thermopod mailer envelopes and Thermokeeper insulated box liners", loated at < http://www.mhpn.com/product/thermopod_mailer_envelopes_and_thermokeeper_insulated_box_liners/packaging>, accessed on Aug. 30, 2017, 2 pgs.

Needles 'N' Knowledge; Article entitled: "Tall Box With Lid", located at <http://needlesnknowledge.blogspot.com/2017/10/tall-box-with-lid.html> (Accessed: Jan. 12, 2017), 10 pgs.
Salazar Packaging; Article entitle: "Custom Packaging and Design", located at <https://salazarpackaging.com/custom-packaging-and-design/>, accessed on Sep. 28, 2017, 2 pgs.
Tera-Pak; Article entitled: "Insulated Shipping Containers", located at <http://www.tera-pak.com/>, accessed on Mar. 20, 2017, 3 pgs.
UN Packaging; Article entitled: "CooLiner ® Insulated Shipping Bags", available at <http://www.chem-tran.com/packaging/supplies/cooliner-insulated-shipping-bags.php>, accessed on Aug. 30, 2017, 2 pgs.
weiku.com; Article entitled: "100% Biodegradable Packing materials Green Cell Foam Stock Coolers", located at <http://www.weiku.com/products/18248504/100_Biodegradable_Packing_materials_Green_Cell_Foam_Stock_Coolers.html>, accessed on Sep. 28, 2017, 7 pgs.
Waltermire, Jamie; Non-Final Office Action for U.S. Appl. No. 16/526,511, filed Jul. 30, 2019, dated Dec. 9, 2019, 55 pgs.
Waltermire, Jamie; Non-Final Office Action for U.S. Appl. No. 16/530,045, filed Aug. 2, 2019, dated Dec. 20, 2019, 61 pgs.
Waltermire, Jamie; Supplemental Notice of Allowance for U.S. Appl. No. 15/590,345, filed May 9, 2017, dated Dec. 3, 2019, 14 pgs.
Waltermire, Jamie; Applicant-Initiated Interview Summary for U.S. Appl. No. 15/590,349, filed May 9, 2017, dated Dec. 3, 2019, 3 pgs.
Waltermire, Jamie; Final Office Action for U.S. Appl. No. 15/590,349, filed May 9, 2017, dated Jan. 6, 2020, 26 pgs.
Waltermire, Jamie; Corrected Notice of Allowance for U.S. Appl. No. 15/663,905, filed Jul. 31, 2017, dated Nov. 18, 2019, 6 pgs.
Waltermire, Jamie; Corrected Notice of Allowance for U.S. Appl. No. 15/663,905, filed Jul. 31, 2017, dated Dec. 26, 2019, 7 pgs.
Waltermire, Jamie; Notice of Allowance for U.S. Appl. No. 15/663,905, filed Jul. 31, 2017, dated Nov. 4, 2019, 18 pgs.
Waltermire, Jamie; Final Office Action for U.S. Appl. No. 16/381,678, filed Apr. 11, 2019, dated Dec. 30, 2019, 17 pgs.
Sollie, Greg; Corrected Notice of Allowance for U.S. Appl. No. 15/845,545, filed Dec. 18, 2017, dated Oct. 31, 2019, 12 pgs.
Sollie, Greg; Final Office Action for U.S. Appl. No. 15/845,540, filed Dec. 18, 2017, dated Oct. 30, 2019, 56 pgs.
Collison, Alan B.; Notice of Allowance for U.S. Appl. No. 15/677,738, filed Aug. 15, 2017, dated Oct. 29, 2019, 14 pgs.
Collison, Alan B.; Supplemental Notice of Allowance for U.S. Appl. No. 15/677,738, filed Aug. 15, 2017, dated Dec. 10, 2019, 4 pgs.
Sollie, Greg; Applicant Initiated Interview Summary for U.S. Appl. No. 15/988,550, filed May 24, 2018, dated Dec. 27, 2019, 3 pgs.
Sollie, Greg; Non-Final Office Action for U.S. Appl. No. 16/280,595, filed Feb. 20, 2019, dated Dec. 19, 2019, 23 pgs.
Sollie, Greg; Final Office Action for U.S. Appl. No. 16/530,052, filed Aug. 2, 2019, dated Dec. 27, 2019, 49 pgs.
Sollie, Greg; Non-Final Office Action for U.S. Appl. No. 16/567,192, filed Sep. 11, 2019, dated Dec. 10, 2019, 49 pgs.
Waltermire, Jamie; Notice of Allowance for U.S. Appl. No. 15/482,200, filed Apr. 7, 2017, dated May 14, 2019, 25 pgs.
Waltermire, Jamie; Final Office Action for U.S. Appl. No. 15/590,349, filed May 9, 2017, dated May 9, 2019, 31 pgs.
Waltermire, Jamie; Non-Final Office Action for U.S. Appl. No. 15/663,905, filed Jul. 31, 2017, dated Jun. 25, 2019, 66 pgs.
Sollie, Greg; Notice of Allowance for U.S. Appl. No. 15/845,545, filed Dec. 18, 2017, dated Jun. 19, 2019, 20 pgs.
Collison, Alan B.; Notice of Allowance for U.S. Appl. No. 15/677,738, filed Aug. 15, 2017, dated Jun. 19, 2019, 10 pgs.
Sollie, Greg; Non-Final Office Action for U.S. Appl. No. 15/988,550, filed May 24, 2018, dated May 29, 2019, 48 pgs.
Sollie, Greg; Non-Final Office Action for U.S. Appl. No. 16/280,595, filed Feb. 20, 2019, dated May 29, 2019, 60 pgs.
Sollie, Greg; International Search Report and Written Opinion for PCT Application No. PCT/US18/65459, filed Dec. 13, 2018, dated May 1, 2019, 15 pgs.
Voluntary Standard for Repulping and Recycling Corrugated Fiberboard Treated to Improve Its Performance in the Presence of Water and Water Vapor. (revises Aug. 16, 2013) Fibre Box Association

(56) References Cited

OTHER PUBLICATIONS (FBA), Elk Grove Village, IL, 1-23, Retrieved from http://www.corrugated.org/wp-content/uploads/PDFs/Recycling/Vol_Std_Protocol_2013. pdf, 23 pgs.
Waltermire, Jamie; Final Office Action for U.S. Appl. No. 15/590,345, filed May 9, 2017, dated Mar. 19, 2019, 42 pgs.
Waltermire, Jamie; Requirement for Restriction/Election for U.S. Appl. No. 15/663,905, filed Jul. 31, 2017, dated Mar. 21, 2019, 8 pgs.
Sollie, Greg; Non-Final Office Action for U.S. Appl. No. 15/845,545, filed Dec. 18, 2017, dated Mar. 5, 2019, 41 pgs.
Sollie, Greg; Non-Final Office Action for U.S. Appl. No. 15/845,540, filed Dec. 18, 2017, dated Apr. 2, 2019, 50 pgs.
Collison, Alan B.; Final Office Action for U.S. Appl. No. 15/677,738, filed Aug. 15, 2017, dated Feb. 28, 2019, 14 pgs.
Cellulose Material Solutions, LLC; Brochure for Infinity Care Thermal Liner, accessed on Oct. 22, 2018, 2 pgs.
Uline; Article entitled: Corrugated Corner Protectors—4×4", accessed on Oct. 25, 2018, 1 pg.
DHL Express; Brochure for Dry Ice Shipping Guidelines, accessed on Oct. 26, 2018, 12 pgs.
Thomas Scientific; Article entitled: "Thermosafe: Test Tube Shipper/Rack", accessed on Oct. 26, 2018, 2 pgs.
Stinson, Elizabeth; Article entitled: "A Pizza Geek Discovers the World's Smartest Pizza Box", published Jan. 17, 2014, 8 pgs.
Waltermire, Jamie; International Search Report and Written Opinion for PCT Application No. PCT/US18/65464, filed Dec. 13, 2018, dated Mar. 11, 2019, 9 pgs.
Sollie, Greg; International Search Report and Written Opinion for PCT Application No. PCT/US18/65461, filed Dec. 13, 2018, dated Mar. 21, 2019, 13 pgs.
Sollie, Greg; International Search Report and Written Opinion for PCT/US18/65463, filed Dec. 13, 2018, dated Mar. 25, 2019, 11 pgs.
Waltermire, Jamie; Requirement for Restriction/Election for U.S. Appl. No. 15/482,186, filed Apr. 7, 2017, dated Apr. 17, 2019, 7 pgs.
Collison, Alan B.; Applicant Interview Summary for U.S. Appl. No. 15/677,738, filed Aug. 15, 2017, dated Apr. 22, 2019, 4 pgs.
Waltermire, Jamie; Corrected Notice of Allowance for U.S. Appl. No. 15/482,186, filed Apr. 7, 2017, dated Sep. 2, 2020, 12 pgs.
Waltermire, Jamie; Notice of Allowance for U.S. Appl. No. 16/526,511, filed Jul. 30, 2019, dated Sep. 14, 2020, 18 pgs.
Waltermire, Jamie; Final Office Action for U.S. Appl. No. 16/293,716, filed Mar. 6, 2019, dated Sep. 10, 2020, 24 pgs.
Waltermire, Jamie; Final Office Action for U.S. Appl. No. 16/381,678, filed Apr. 11, 2019, dated Aug. 20, 2020, 21 pgs.
Waltermire, Jamie; Notice of Allowance for U.S. Appl. No. 16/381,678, filed Apr. 11, 2019, dated Jul. 30, 2020, 15 pgs.
Waltermire, Jamie; Final Office Action for U.S. Appl. No. 16/561,203, filed Sep. 5, 2019, dated Sep. 10, 2020, 25 pgs.
Waltermire, Jamie; Requirement for Restriction/Election for U.S. Appl. No. 16/689,433, filed Nov. 20, 2019, dated Oct. 16, 2020, 6 pgs.
Sollie, Greg; Final Office Action for U.S. Appl. No. 16/552,277, filed Aug. 27, 2019, dated Aug. 7, 2020, 19 pgs.
Sollie, Greg; Notice of Allowance for U.S. Appl. No. 16/552,277, filed Aug. 27, 2019, dated Aug. 31, 2020, 6 pgs.
Sollie, Greg; Final Office Action for U.S. Appl. No. 15/845,540, filed Dec. 18, 2017, dated Sep. 2, 2020, 28 pgs.
Sollie, Greg; Notice of Allowance for U.S. Appl. No. 15/845,540, filed Dec. 18, 2017, dated Sep. 17, 2020, 5 pgs.
Collison, Alan B.; Applicant-Initiated Interview Summary for U.S. Appl. No. 16/414,309, filed May 16, 2019, dated Aug. 21, 2020, 3 pgs.
Collison, Alan B.; Applicant-Initiated Interview Summary for U.S. Appl. No. 16/414,309, filed May 16, 2019, dated Oct. 15, 2020, 3 pgs.
Collison, Alan B.; Final Office Action for U.S. Appl. No. 16/414,309, filed May 16, 2019, dated Oct. 8, 2020, 15 pgs.
Collison, Alan B.; Applicant-Initiated Interview Summary for U.S. Appl. No. 16/414,310, filed May 16, 2019, dated Jul. 30, 2020, 3 pgs.
Collison, Alan; Final Office Action for U.S. Appl. No. 16/414,310, filed May 16, 2019, dated Oct. 13, 2020, 30 pgs.
Sollie, Greg; Final Office Action for U.S. Appl. No. 15/988,550, filed May 24, 2018, dated Aug. 27, 2020, 27 pgs.
Sollie, Greg; Non-Final Office Action for U.S. Appl. No. 16/280,595, filed Feb. 20, 2019, dated Aug. 28, 2020, 26 pgs.
Sollie, Greg; Final Office Action for U.S. Appl. No. 16/530,052, filed Aug. 2, 2019, dated Aug. 28, 2020, 29 pgs.
Sollie, Greg; Notice of Allowance for U.S. Appl. No. 16/401,603, filed May 2, 2019, dated Aug. 31, 2020, 14 pgs.
Sollie, Greg; Non-Final Office Action for U.S. Appl. No. 16/401,607, filed May 2, 2019, dated Aug. 19, 2020, 88 pgs.
Sollie, Greg; Corrected Notice of Allowance for U.S. Appl. No. 16/382,710, filed Apr. 12, 2019, dated Sep. 24, 2020, 9 pgs.
Sollie, Greg; Notice of Allowance for U.S. Appl. No. 16/567,192, filed Sep. 11, 2019, dated Aug. 7, 2020, 14 pgs.
Sollie, Greg; Non-Final Office Action for U.S. Appl. No. 16/408,981, filed May 10, 2019, dated Sep. 16, 2020, 40 pgs.
MP Global Products LLC: European Search Report Response for serial No. 17868605.1, filed Oct. 2, 2020, 15 pgs.
Waltermire, Jamie; Supplemental Notice of Allowance for U.S. Appl. No. 15/482,200, filed Apr. 7, 2017, dated Jul. 26, 2019, 9 pgs.
Waltermire, Jamie; Supplemental Notice of Allowance for U.S. Appl. No. 15/482,200, filed Apr. 7, 2017, dated Aug. 12, 2019, 7 pgs.
Sollie, Greg; Requirement for Restriction/Election for U.S. Appl. No. 16/382,710, filed Apr. 12, 2019, dated Jul. 15, 2019, 6 pgs.
Periwrap; Article entitled: "Insulated Solutions", located at <https://www.peri-wrap.com/insulation/>, accessed on Dec. 3, 2018, 9 pgs.
Collison, Alan B.; Corrected Notice of Allowance for U.S. Appl. No. 15/677,738, filed Aug. 15, 2017, dated Jul. 15, 2019, 7 pgs.
Waltermire, Jamie; Corrected Notice of Allowance for U.S. Appl. No. 16/526,511, filed Jul. 30, 2019, dated Oct. 30, 2020, 14 pgs.
Waltermire, Jamie; Corrected Notice of Allowance for U.S. Appl. No. 16/526,511, filed Jul. 30, 2019, dated Nov. 30, 2020, 9 pgs.
Waltermire, Jamie; Final Office Action for U.S. Appl. No. 16/530,045, filed Aug. 2, 2019, dated Nov. 24, 2020, 40 pgs.
Waltermire, Jamie; Corrected Notice of Allowance for U.S. Appl. No. 15/590,349, filed May 9, 2017, dated Nov. 2, 2020, 9 pgs.
Waltermire, Jamie; Notice of Allowance for U.S. Appl. No. 15/590,349, filed May 9, 2017, dated Oct. 20, 2020, 20 pgs.
Waltermire, Jamie; Final Office Action for U.S. Appl. No. 16/293,716, filed Mar. 6, 2019, dated Oct. 29, 2020, 19 pgs.
Waltermire, Jamie; Non-Final Office Action for U.S. Appl. No. 16/526,555, filed Jul. 30, 2019, dated Oct. 27, 2020, 39 pgs.
Waltermire, Jamie; Final Office Action for U.S. Appl. No. 16/381,678, filed Apr. 11, 2019, dated Oct. 19, 2020, 24 pgs.
Waltermire, Jamie; Notice of Allowance for U.S. Appl. No. 16/561,203, filed Sep. 5, 2019, dated Nov. 3, 2020, 14 pgs.
Waltermire, Jamie; Requirement for Restriction/Election for U.S. Appl. No. 16/689,407, filed Nov. 20, 2019, dated Oct. 29, 2020, 6 pgs.
Sollie, Greg; Corrected Notice of Allowance for U.S. Appl. No. 16/552,277, filed Aug. 27, 2019, dated Nov. 5, 2020, 9 pgs.
Collison, Alan B.; Advisory Action for U.S. Appl. No. 16/658,756, filed Oct. 21, 2019, dated Sep. 25, 2020, 4 pgs.
Collison, Alan B.; Notice of Allowance for U.S. Appl. No. 16/658,756, filed Oct. 21, 2019, dated Oct. 23, 2020, 10 pgs.
Collison, Alan B.; Corrected Notice of Allowance for U.S. Appl. No. 16/414,309, filed May 16, 2019, dated Nov. 16, 2020, 10 pgs.
Collison, Alan B.; Corrected Notice of Allowance for U.S. Appl. No. 16/414,309, filed May 16, 2019, dated Nov. 27, 2020, 9 pgs.
Collison, Alan B.; Notice of Allowance for U.S. Appl. No. 16/414/309, filed May 16, 2019, dated Oct. 21, 2020, 6 pgs.
Collison, Alan B.; Notice of Allowance for U.S. Appl. No. 16/414,310, filed May 16, 2019, dated Nov. 13, 2020, 15 pgs.
Collison, Alan B.; Supplemental Notice of Allowance for U.S. Appl. No. 16/414,310, filed May 16, 2019, dated Dec. 3, 2020, 8 pgs.
Sollie, Greg; Corrected Notice of Allowance for U.S. Appl. No. 16/401,603, filed May 2, 2019, dated Nov. 24, 2020, 8 pgs.

(56) References Cited

OTHER PUBLICATIONS

Sollie, Greg; Corrected Notice of Allowance for U.S. Appl. No. 16/401,603, filed May 2, 2019, dated Nov. 3, 2020, 9 pgs.
Sollie, Greg; Notice of Allowance for U.S. Appl. No. 16/401,607, filed May 2, 2019, dated Dec. 4, 2020, 12 pgs.
Sollie, Greg; Notice of Allowance for U.S. Appl. No. 16/382,710, filed Apr. 12, 2019, dated Oct. 21, 2020, 5 pgs.
Sollie, Greg; Corrected Notice of Allowance for U.S. Appl. No. 16/567,192, filed Sep. 11, 2019, dated Oct. 20, 2020, 8 pgs.
Sollie, Greg; International Preliminary Report on Patentability for PCT/US18/65463, filed Dec. 13, 2018, dated Dec. 3, 2020, 9 pgs.
Waltermire, Jamie; Certificate of Correction for U.S. Appl. No. 15/482,186, filed Apr. 7, 2017, dated Dec. 29, 2020, 1 pg.
Waltermire, Jamie; Corrected Notice of Allowance for U.S. Appl. No. 15/590,349, filed May 9, 2017, dated Dec. 22, 2020, 9 pgs.
Waltermire, Jamie; Corrected Notice of Allowance for U.S. Appl. No. 15/590,349, filed May 9, 2017, dated Feb. 5, 2021, 9 pgs.
Waltermire, Jamie; Non-Final Office Action for U.S. Appl. No. 16/293,716, filed Mar. 6, 2019, dated Feb. 5, 2021, 18 pgs.
Waltermire, Jamie; Corrected Notice of Allowance for U.S. Appl. No. 16/561,203, filed Sep. 5, 2019, dated Jan. 5, 2021, 9 pgs.
Waltermire, Jamie; Corrected Notice of Allowance for U.S. Appl. No. 16/561,203, filed Sep. 5, 2019, dated Feb. 5, 2021, 8 pgs.
Waltermire, Jamie; Non-Final Office Action for U.S. Appl. No. 16/689,407, filed Nov. 20, 2019, dated Jan. 8, 2021, 92 pgs.
Sollie, Greg; Corrected Notice of Allowance for U.S. Appl. No. 16/552,277, filed Aug. 27, 2019, dated Dec. 22, 2020, 7 pgs.
Sollie, Greg; Corrected Notice of Allowance for U.S. Appl. No. 16/552,277, filed Aug. 27, 2019, dated Feb. 9, 2021, 9 pgs.
Solie, Greg; Corrected Notice of Allowance for U.S. Appl. No. 15/845,540, filed Dec. 18, 2017, dated Dec. 21, 2020, 9 pgs.
Sollie, Greg; Corrected Notice of Allowance for U.S. Appl. No. 15/845,540, filed Dec. 18, 2017, dated Feb. 12, 2021, 8 pgs.
Collison, Alan B.; Corrected Notice of Allowance for U.S. Appl. No. 16/658,756, filed Oct. 21, 2019, dated Jan. 28, 2021, 3 pgs.
MP Global Products LLC: Office Action for European application No. 17868605.1, dated Dec. 3, 2020, 4 pgs.
MP Global Products, LLC; Examination Report for Australian patent application No. 2017359035, dated Nov. 27, 2020, 3 pgs.
MP Global Products, LLC; Office Action for Chinese patent application No. 201780081689.7, dated Nov. 2, 2020, 17 pgs.
Collison, Alan B.; Non-Final Office Action for U.S. Appl. No. 17/123,676, filed Dec. 16, 2020, dated Feb. 3, 2021, 23 pgs.
Sollie, Greg; Applicant-Initiated Interview Summary for U.S. Appl. No. 15/988,550, filed May 24, 2018, dated Dec. 24, 2020, 2 pgs.
Sollie, Greg; Final Office Action for U.S. Appl. No. 16/280,595, filed Feb. 20, 2019, dated Dec. 30, 2020, 25 pgs.
Sollie, Greg; Non-Final Office Action for U.S. Appl. No. 16/530,052, filed Aug. 2, 2019, dated Dec. 18, 2020, 17 pgs.
Sollie, Greg; Corrected Notice of Allowance for U.S. Appl. No. 16/401,607, filed May 2, 2019, dated Jan. 4, 2021, 9 pgs.
Sollie, Greg; Certificate of Correction for U.S. Appl. No. 16/567,192, filed Sep. 11, 2019, dated Feb. 16, 2021, 1 pg.
Sollie, Greg; Final Office Action for U.S. Appl. No. 16/408,981, filed May 10, 2019, dated Dec. 29, 2020, 22 pgs.
Sollie, Greg; Requirement for Restriction/Election for U.S. Appl. No. 16/886,040, filed May 28, 2020, dated Dec. 23, 2020, 6 pgs.
MP Global Products, LLC; First Examination Report for Australian patent application No. 2017359035, filed Nov. 7, 2017, dated Nov. 27, 2020, 3 pgs.
MP Global Products LLC: European Office Action for application No. 17868605.1, dated Dec. 3, 2020, 4 pgs.
MP Global Products LLC: European Office Action Response for application No. 17868605.1, filed Jan. 19, 2021, 15 pgs.
Waltermire, Jamie; Final Office Action for U.S. Appl. No. 16/526,555, filed Jul. 30, 2019, dated Mar. 8, 2021, 25 pgs.
Waltermire, Jamie; Non-Final Office Action for U.S. Appl. No. 16/381,678, filed Apr. 11, 2019, dated Mar. 5, 2021, 36 pgs.
Waltermire, Jamie; Final Office Action for U.S. Appl. No. 16/689,407, filed Nov. 20, 2019, dated Apr. 23, 2021, 18 pgs.
Waltermire, Jamie; Non-Final Office Action for U.S. Appl. No. 16/689,433, filed Nov. 20, 2019, dated Feb. 23, 2021, 88 pgs.
Collison, Alan B.; Certificate of Correction for U.S. Appl. No. 16/414,309, filed May 16, 2019, dated Mar. 9, 2021, 1 pg.
Collison, Alan B.; Non-Final Office Action for U.S. Patent Application No. 17/123,673, filed Dec. 16, 2020, mailed Mar. 23, 2021, 86 pgs.
Collison, Alan B.; Applicant-Initiated Interview Summary for U.S. Appl. No. 17/123,676, filed Dec. 16, 2020, dated May 4, 2021, 4 pgs.
Collison, Alan B.; Notice of Allowance for U.S. Appl. No. 17/123,676, filed Dec. 16, 2020, dated May 13, 2021, 93 pgs.
Sollie, Greg; Corrected Notice of Allowance for U.S. Appl. No. 15/988,550, filed May 24, 2018, dated May 10, 2021, 9 pgs.
Sollie, Greg; Notice of Allowance for U.S. Appl. No. 15/988,550, filed May 24, 2018, dated Apr. 13, 2021, 21 pgs.
Sollie, Greg; Non-Final Office Action for U.S. Appl. No. 16/280,595, filed Feb. 20, 2019, dated Apr. 9, 2021, 20 pgs.
Sollie, Greg; Final Office Action for U.S. Patent Appl. No. 16/530,052, filed Aug. 2, 2019, dated Apr. 20, 2021, 27 pgs.
Sollie, Greg; Corrected Notice of Allowance for U.S. Appl. No. 16/401,607, filed May 2, 2019, dated Mar. 15, 2021, 13 pgs.
Sollie, Greg; Corrected Notice of Allowance for U.S. Appl. No. 16/401,607, filed May 2, 2019, dated Apr. 29, 2021, 8 pgs.
Sollie, Greg; Requirement for Restriction/Election for U.S. Patent Appl. No. 16/879,811, filed May 21, 2020, dated Apr. 15, 2021, 6 pgs.
Sollie, Greg; Corrected Notice of Allowance for U.S. Appl. No. 16/408,981, filed May 10, 2019, dated Mar. 15, 2021, 9 pgs.
Sollie, Greg; Corrected Notice of Allowance for U.S. Appl. No. 16/408,981, filed May 10, 2019, dated Apr. 29, 2021, 6 pgs.
Sollie, Greg; Notice of Allowance for U.S. Patent Appl. No. 16/408,981, filed May 10, 2019, dated Feb. 23, 2021, 6 pgs.
Sollie, Greg; Non-Final Office Action for U.S. Appl. No. 16/886,040, filed May 28, 2020, dated Mar. 30, 2021, 39 pgs.
MP Global Products LLC: European Office Action for application No. 17868605.1, dated Apr. 13, 2021, 3 pgs.
Collison, Alan. B.; Extended European Search Report for application No. 21160713.0, filed Nov. 7, 2017, dated May 10, 2021, 7 pgs.
Waltermire, Jamie; Certificate of Correction for U.S. Appl. No. 15/590,349, filed May 9, 2017, dated. Mar. 1, 2021, 1 pg.
Waltermire, Jamie; Notice of Allowance for U.S. Appl. No. 16/526,555, filed Jul. 30, 2019, dated May 21, 2021, 32 pgs.
Waltermire, Jamie; Notice of Allowance for U.S. Appl. No. 16/381,678, filed Apr. 11, 2019, dated Mar. 3, 2021, 14 pgs.
Sollie, Greg; Certificate of Correction for U.S. Appl. No. 15/845,540, filed Dec. 18, 2017, dated Jun. 1, 2021, 1 pg.
Collison, Alan B.; Supplemental Notice of Allowance for U.S. Appl. No. 17/123,676, filed Dec. 16, 2020, dated Jun. 1, 2021, 10 pgs.
Sollie, Greg; International Preliminary Report on Patentability for PCT Application No. PCT/US19/60486, filed Nov. 18, 2019, dated May 27, 2021, 9 pgs.
Sollie, Greg; International Preliminary Report on Patentability for PCT Application No. PCT/US19/59764, filed Nov. 5, 2019, dated May 27, 2021, 9 pgs.

* cited by examiner

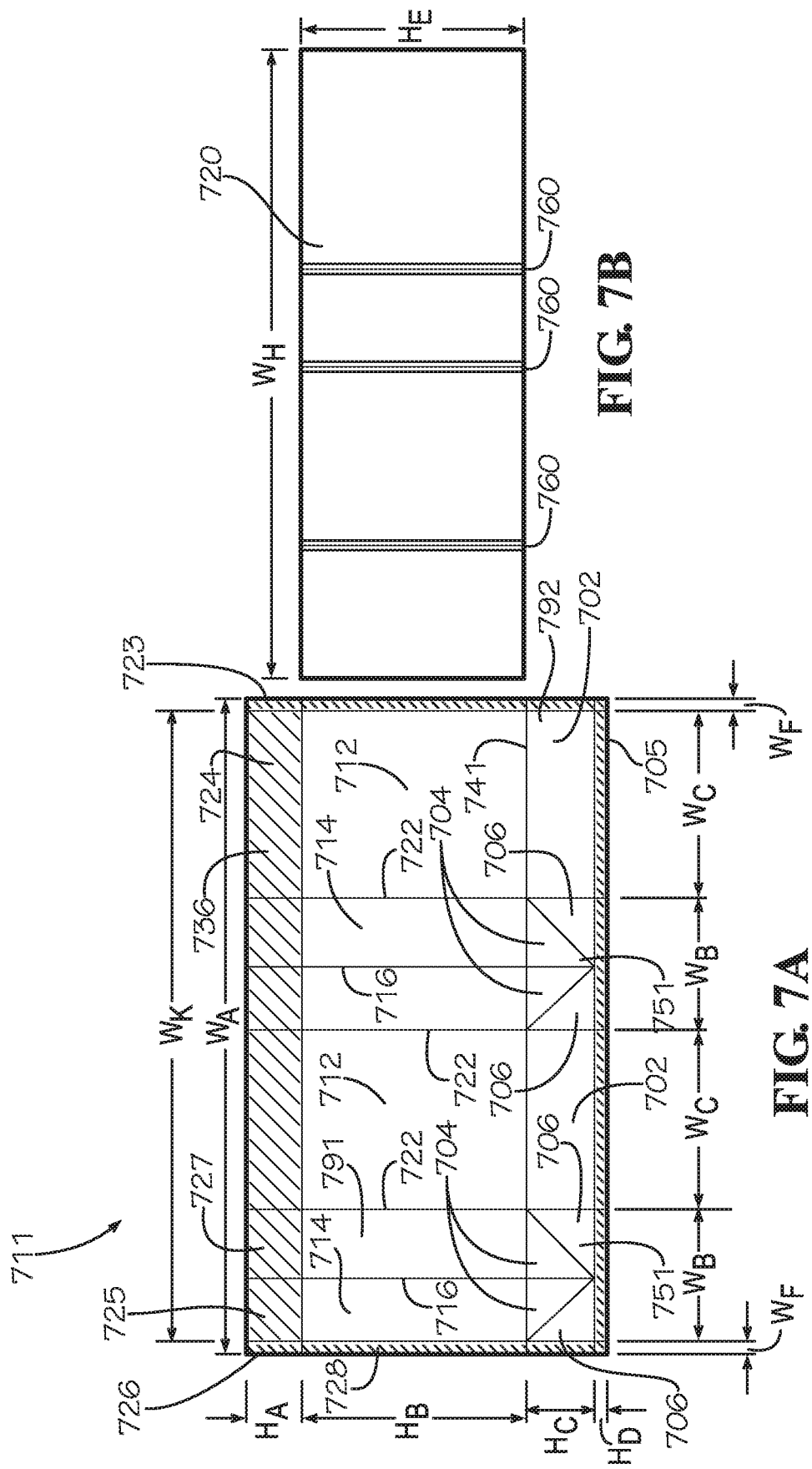

INSULATED BAG

REFERENCE TO RELATED APPLICATIONS

This application is a divisional of U.S. application Ser. No. 15/482,200, filed Apr. 7, 2017, which is hereby specifically incorporated by reference herein in its entirety.

JOINT RESEARCH AGREEMENT

The subject matter disclosed was developed and the claimed invention was made by, or on behalf of, one or more parties to a joint research agreement between MP Global Products LLC of Norfolk, Nebr. and Pratt Retail Specialties, LLC of Conyers, Ga., that was in effect on or before the effective filing date of the claimed invention, and the claimed invention was made as a result of activities undertaken within the scope of the joint research agreement.

TECHNICAL FIELD

This disclosure relates to packaging. More specifically, this disclosure relates to an insulated bag.

BACKGROUND

Packaging perishable or temperature sensitive contents for storage or shipping can pose challenges. The contents can spoil, destabilize, freeze, melt, or evaporate during storage or shipping if the temperature of the contents is not maintained or the packaging is not protected from hot or cold environmental conditions. Contents such as food, pharmaceuticals, electronics, or other temperature sensitive items can be damaged if exposed to temperature extremes. Many insulated packages are bulky and difficult to store prior to use. Additionally, many insulated packages cannot be recycled and are often disposed of in landfills.

SUMMARY

It is to be understood that this summary is not an extensive overview of the disclosure. This summary is exemplary and not restrictive, and it is intended to neither identify key or critical elements of the disclosure nor delineate the scope thereof. The sole purpose of this summary is to explain and exemplify certain concepts of the disclosure as an introduction to the following complete and extensive detailed description.

Disclosed is an insulated bag assembly comprising an insulated bag, the insulated bag comprising a pair of opposing main panels, the main panels defined in an insulated blank, the insulated blank comprising an insulation batt, a first sheet, and a second sheet, the insulation batt encapsulated in a blank cavity defined between the first sheet and the second sheet, a blank border extending around a perimeter of the insulated blank, the blank border defined by a perimeter portion of the first sheet being in facing engagement with a perimeter portion of the second sheet, the blank border encompassing the blank cavity and defining an insulated portion of the insulated blank, the insulated bag defining a top end and a bottom end, the top end distal from the bottom end, the insulated bag defining a bag cavity with a bag opening positioned at the top end; and an insulated panel, the insulated panel positioned within the bag cavity, the insulated panel forming a seal with the insulated bag.

Also disclosed is an insulated bag comprising a pair of opposing main panels, the insulated bag defining a bag cavity within the insulated bag, the insulated bag defining a bag opening to the bag cavity, the bag opening disposed at a top end of the insulated bag; the main panels defined in an insulated blank, the insulated blank comprising a first sheet; a second sheet, the second sheet attached to the first sheet by a blank border, the blank border extending around a perimeter of the insulated blank, the blank border enclosing a blank cavity defined between the first sheet and the second sheet; and an insulation batt positioned within the blank cavity.

Also disclosed a method for assembling an insulated bag including folding a first main panel of a pair of opposing main panels relative to a first side panel of a pair of opposing side panels about a main crease line, the main panels, the side panels, and the main crease line defined in an insulated blank, the insulated blank including an insulation batt, a first sheet, and a second sheet, the insulation batt encapsulated in a blank cavity defined between the first sheet and the second sheet, a blank border extending around a perimeter of the insulated blank, the blank border defined by a perimeter portion of the first sheet being in facing engagement with a perimeter portion of the second sheet, the blank border encompassing the blank cavity and defining an insulated portion of the insulated blank, the insulated blank defining a first end and a second end, the first end disposed opposite from the second end; attaching the first end to the second end; and forming a bottom panel of the insulated bag by folding a portion of the bottom panel relative to the main panel about a bottom crease line, the bottom panel and the bottom crease line further defined by the insulated blank.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims. The features and advantages of such implementations may be realized and obtained by means of the systems, methods, features particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

The features and components of the following figures are illustrated to emphasize the general principles of the present disclosure. The drawings are not necessarily drawn to scale. Corresponding features and components throughout the figures may be designated by matching reference characters for the sake of consistency and clarity.

FIG. 7A is a top view of a blank sheet.

FIG. 7B is a top view of one aspect of an insulation batt.

DETAILED DESCRIPTION

Figure 1:
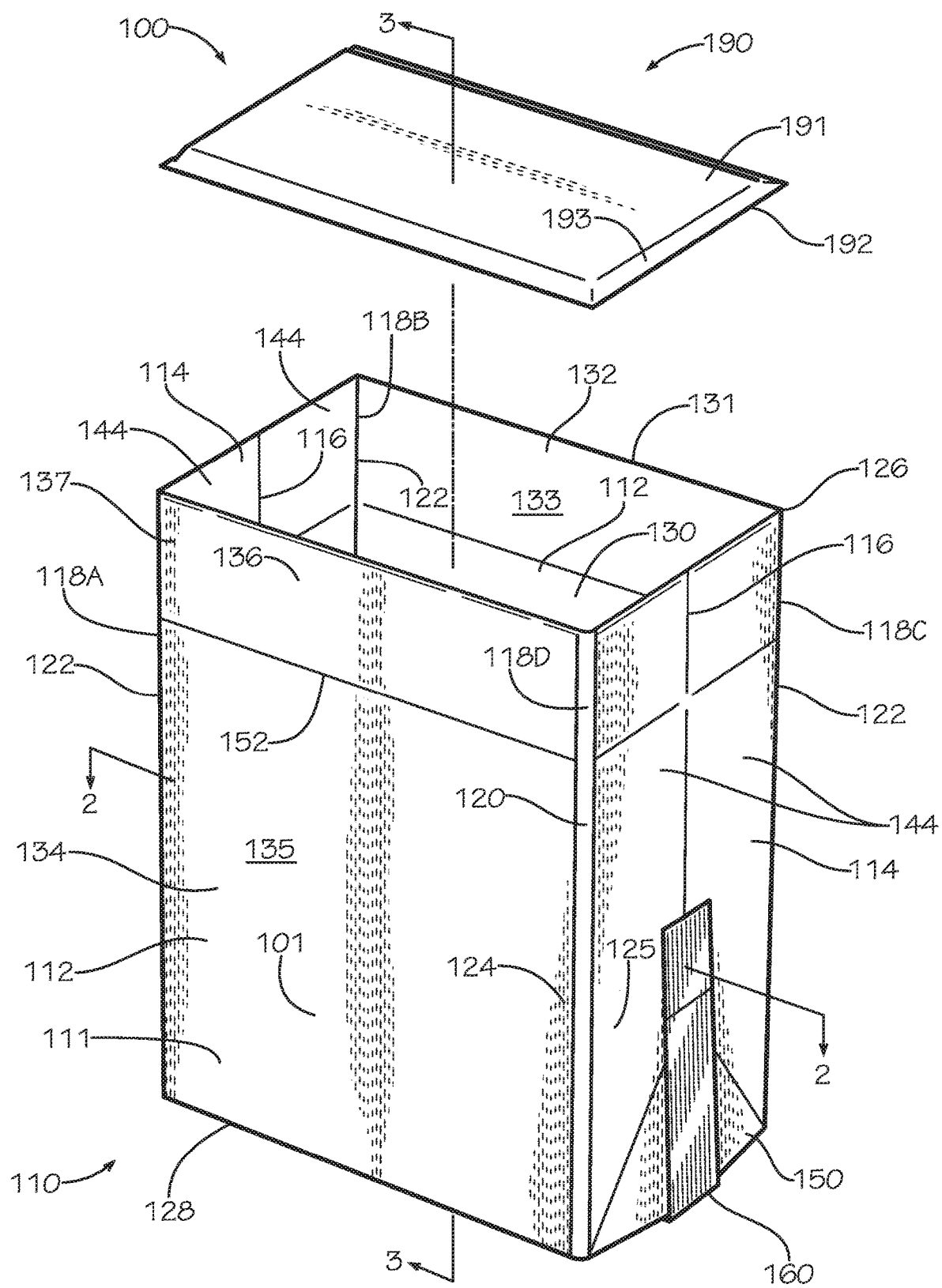
FIG. 1 is a perspective view of an insulated bag assembly in accordance with one aspect of the disclosure.

The present disclosure can be understood more readily by reference to the following detailed description, examples, drawings, and claims, and the previous and following description. However, before the present devices, systems, and/or methods are disclosed and described, it is to be understood that this disclosure is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description is provided as an enabling teaching of the present devices, systems, and/or methods in its best, currently known aspect. To this end, those skilled in the relevant art will recognize and appreciate that many changes can be made to the various aspects of the present devices, systems, and/or methods described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to "an element" can include two or more such elements unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance can or cannot occur, and that the description includes instances where said event or circumstance occurs and instances where it does not.

The word "or" as used herein means any one member of a particular list and also includes any combination of members of that list. Further, one should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific aspect or combination of aspects of the disclosed methods.

In one aspect, disclosed is an insulated bag assembly and associated methods, systems, devices, and various apparatus. The insulated bag assembly can comprise an insulated bag and an insulated blank. It would be understood by one of skill in the art that the disclosed insulated bag assembly is described in but a few exemplary aspects among many. No particular terminology or description should be considered limiting on the disclosure or the scope of any claims issuing therefrom.

FIG. 1 is a perspective view of one aspect of an insulated bag assembly 100. The insulated bag assembly 100 can comprise an insulated bag 110 and an insulated panel 190. In the present aspect, the insulated bag 110 can be assembled from a single insulated blank 111 as shown in FIGS. 4A-D; however in other aspects, the insulated bag 110 can be assembled from multiple insulated blanks 111. The insulated bag 110 can comprise a pair of opposing main panels 112, a pair of opposing side panels 114, and a bottom panel 201 (shown in FIG. 2A). The main panels 112, the side panels 114, and the bottom panel 201 can be defined in the insulated blank 111. The main panels 112 and the side panels 114 can define a bag body 101. The bag body 101 can define a substantially rectangular cross-sectional shape; however in other embodiments, the main panels 112 and the side panels 114 can further define a square or can define a different shape as desired. The rectangular cross-sectional shape can define four corners 118A-D, each defined at a different intersection of a one of the main panels 112 and a one of the side panels 114.

In the present aspect, three of the corners 118A-C can define main crease lines 122. At each of the main crease lines 122, a one of the main panels 112 can fold relative to one of the side panels 114. The fourth corner 118D can define a main seam 120 at which a first end 124 of the insulated blank 111 can be attached to a second end 125 of the insulated blank 111. When the insulated blank 111 is laid flat in an unfolded configuration the first end 124 of the insulated blank 111 can be defined opposite from the second end 125. In the present aspect, a one of the main panels 112 can be positioned proximate the first end 124, and a one of the side panels 114 can be positioned proximate the second end 125. In other aspects, the main seam 120 can be defined extending through one of the main panels 112 or side panels 114 instead of at any of the corner 118. In some aspects, the insulated bag 110 can define more than one main seam 120.

Each side panel 114 can comprise a pair of side subpanels 144. Each pair of side subpanels 144 can be defined by a side crease line 116 which can substantially bisect the respective side panel 114. In some aspects, one of the side crease lines 116 can be replaced by the main seam 120. The pair of side subpanels 144 of each side panel 114 can fold relative to one another about the respective side crease line 116.

Figure 2A:
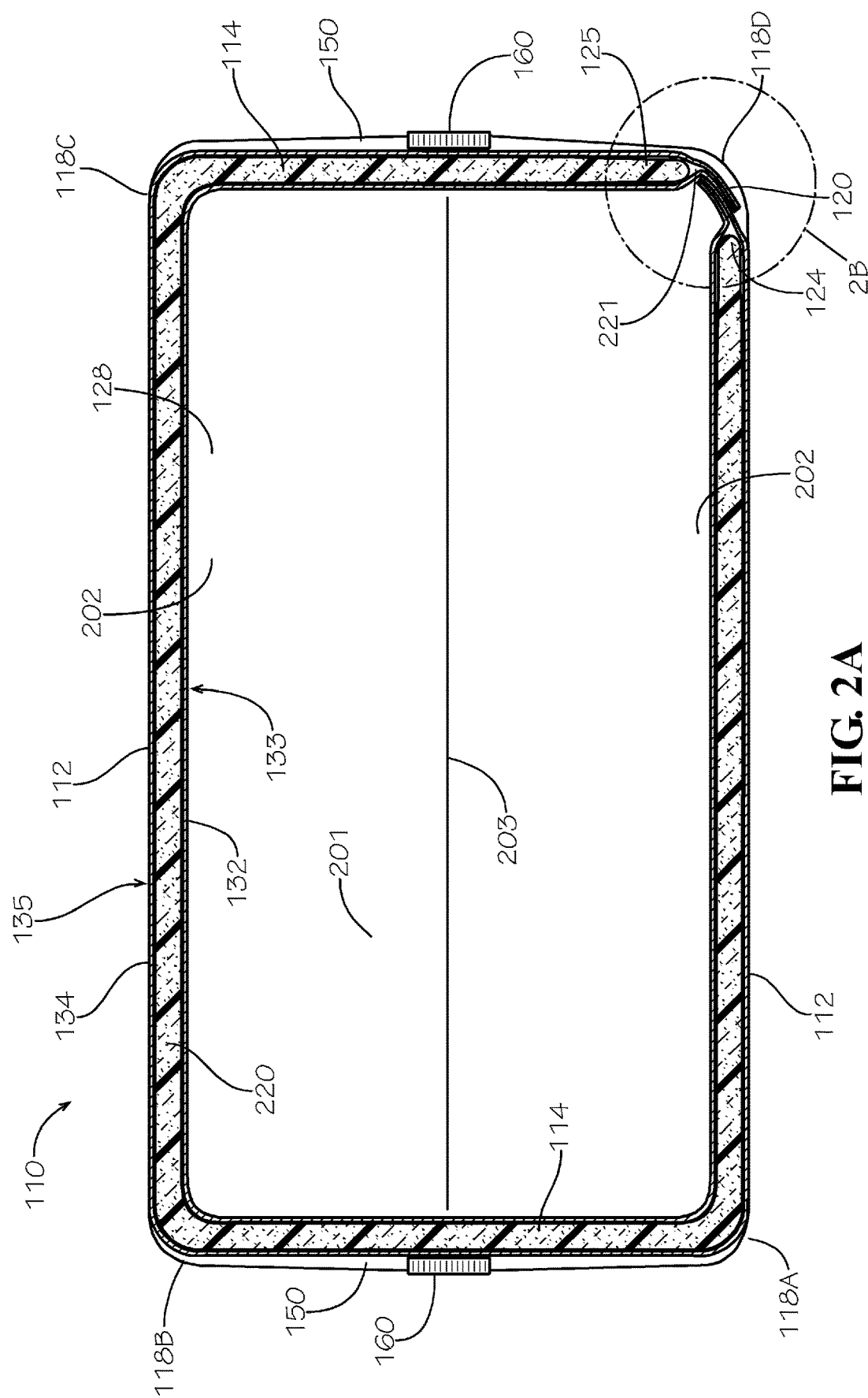
FIG. 2A is a cross-sectional view of an insulated bag of the insulated bag assembly of FIG. 1 taken along line 2-2 in FIG. 1.

As shown in FIG. 2A, the insulated blank 111 can comprise a first sheet 132, a second sheet 134, and an insulation batt 220. The insulation batt 220 can be a single, continuous piece of insulation extending through the main panels 112, the side panels 114, and the bottom panel 201. In some aspects, the single, continuous piece of insulation may only extend through the main panels 112 and the side panels 114 such that the bottom panel is uninsulated or comprises a separate insulation batt. The insulation batt 220 can be positioned between the first sheet 132 and the second sheet 134 in a blank cavity 221 defined between the sheets 132,134 of the insulated blank 111. In the present aspect, the insulation batt 220, the first sheet 132, and the second sheet 134 can each be continuous from the first end 124 to the second end 125 of the insulated blank 111. The ends 124,125 can be attached by the main seam 120 at the corner 118D. In some aspects, the insulation batt 220 can define one or more grooves 760 (as shown in FIG. 7B). Each groove 760 can be positioned in alignment with a one of the crease lines 116,122.

Figure 3A:
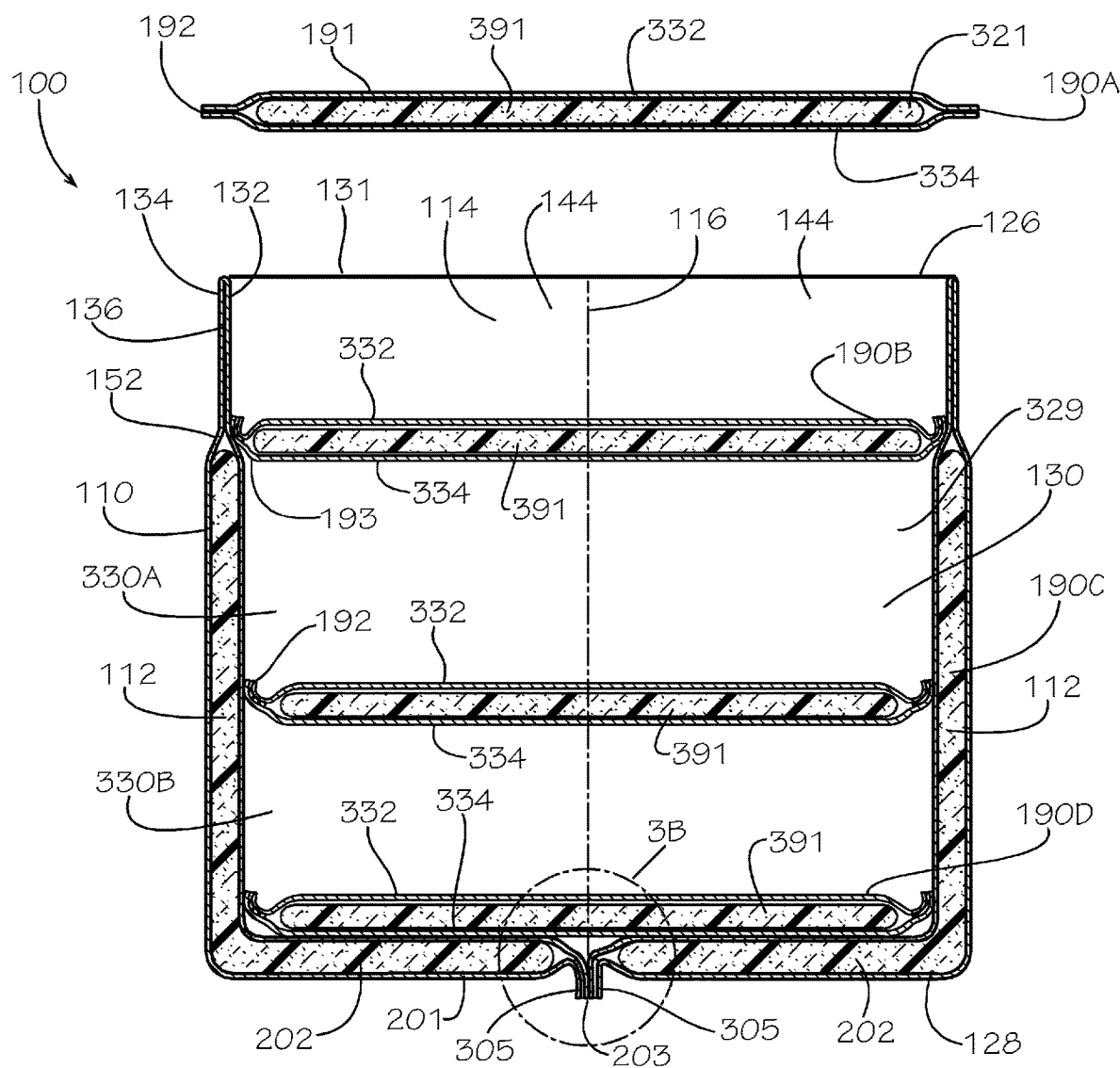
FIG. 3A is a cross-sectional view of another aspect of the insulated bag assembly taken along line 3-3 in FIG. 1.
Figure 4A:
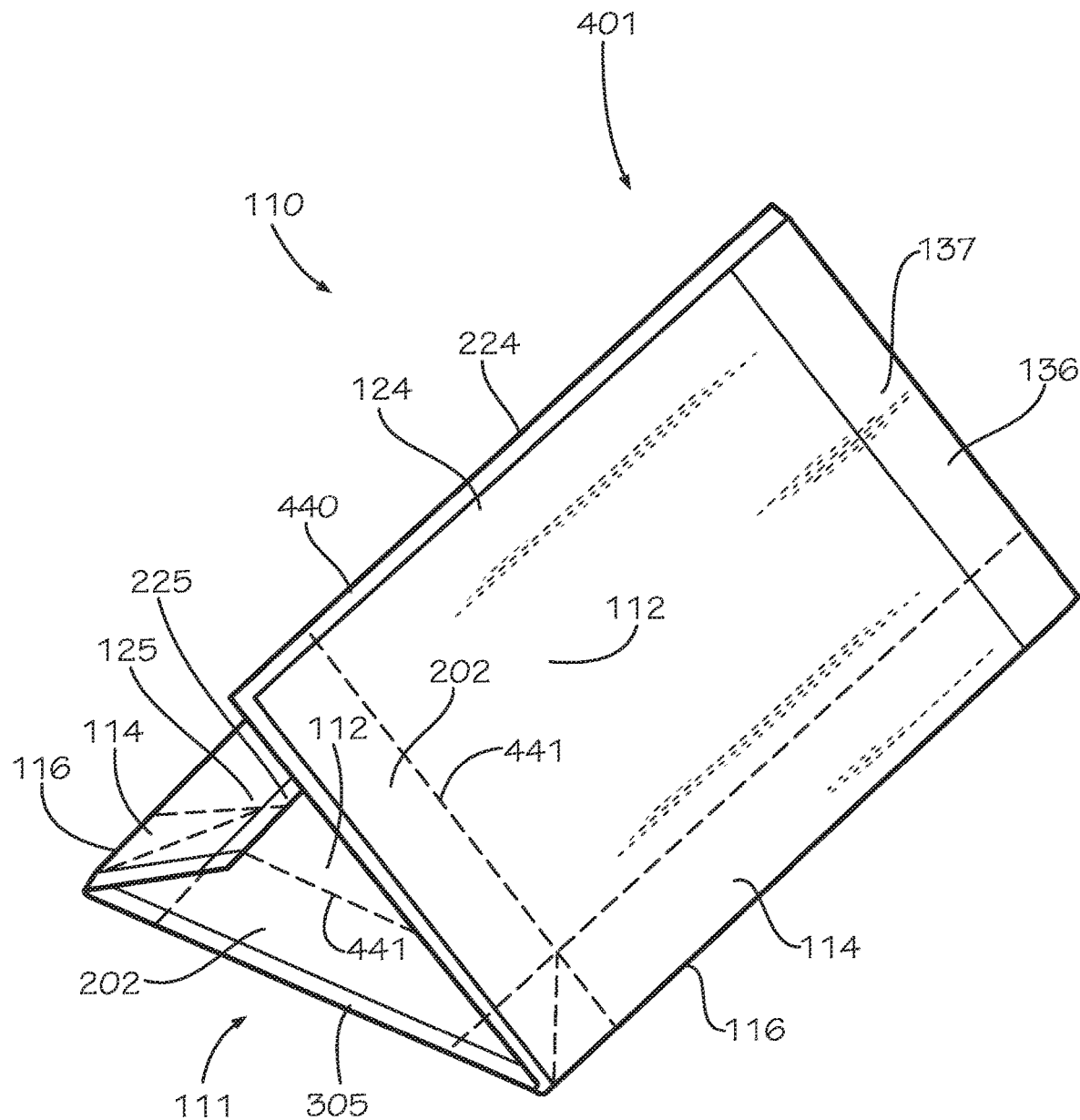
FIG. 4A is a perspective view of an insulated blank in a partially-folded configuration.

As shown in FIG. 4A, a blank border 440 can extend around a perimeter of the insulated blank 111. The blank cavity 221 can be enclosed by the blank border 440. In some aspects, the blank border 440 can seal the blank cavity 221 from an outside environment. The blank border 440 can be formed by attaching together in facing engagement a perimeter portion of the first sheet 132 and a perimeter portion of the second sheet 134 without the insulation batt 220 positioned between the respective portions. The blank border 440 can be uninsulated. The blank border 440 can comprise a top border 137 (shown in FIG. 1), a first end border 224, and a second end border 225 (shown in FIG. 2B), and a bottom border 305 (shown in FIG. 3A). The process is further described below with respect to FIG. 6.

The first sheet 132 can define an inner surface 133, and the second sheet 134 can define an outer surface 135 of the insulated bag 110. The insulated bag 110 can define a top end 126 and a bottom end 128 distal from the top end 126. The main seam 120 can extend from the top end 126 to the bottom end 128. The inner surface 133 can define a bag cavity 130 with a bag opening 131 positioned at the top end 126. In the present embodiment, the top border 137 of the blank border 440 can be positioned at the top end 126 of the insulated bag 110 extending around the bag opening 131. In the aspect shown, the top border 137 can be extended relative to other portions of the blank border 440, and the top border 137 can define an uninsulated bag lip 136. In other aspects, the top border 137 can extend a similar distance as other portions of the blank border 440. In some aspects, the insulated bag 110 can define a taper extending towards the top border 137, and the taper can define a bag beveled edge 152 proximate the bag opening 131. In the present aspect, the blank border 440 can extend around the bag opening 131, extend from the top end 126 to the bottom end 128, and extend across the bottom panel 201.

In the present aspect, the insulated bag 110 can further comprise a pair of wings 150 which can be secured by a tape strip 160. In other aspects, the wings 150 can be secured by an adhesive or other suitable method. The wings 150 can be formed in one aspect of a method of assembly as shown in FIGS. 4A-D. In the present aspect, the tape strip 160 can secure each wing 150 to the outer surface 135 of a one of the side panels 114. In some aspects, the tape strip 160 can extend from one side panel 114, across the bottom panel 201 to the opposite side panel 114, and secure both wings 150. In such aspects, the tape strip 160 can reinforce the bottom panel 201 and a bottom seam 203 (shown in FIG. 2A). In other aspects, each wing 150 can be secured by a separate tape strip 160. In some aspects, the insulated bag 110 may not comprise the wings 150.

The insulated panel 190 of the insulated bag assembly 100 can define a panel insulated portion 191 and a panel border 192. A taper between the panel insulated portion 191 and the panel border 192 can define a panel beveled edge 193. The insulated panel 190 can be shaped and sized complimentary to the bag opening 131. In some aspects, the insulated panel 190 can be configured to cover the bag opening 131, and the panel beveled edge 193 can cooperate with the bag beveled edge 152 to form a seal as shown in FIG. 3A.

Figure 9:
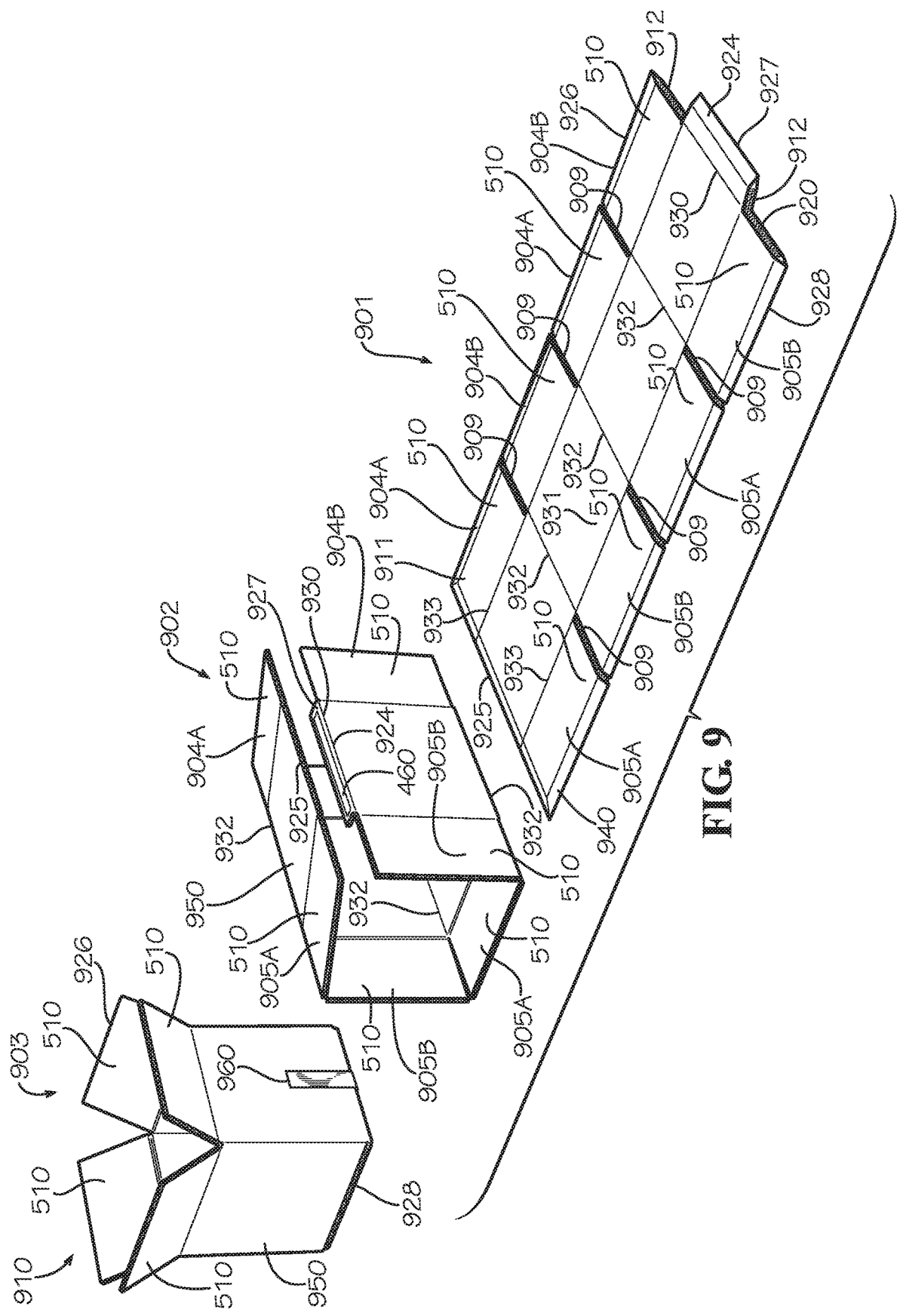
FIG. 9 is a perspective view of a method of assembling one aspect of the insulated bag comprising flaps.

FIG. 2A depicts a cross-sectional view of the insulated bag 110 of FIG. 1 taken across line 2-2 as shown in FIG. 1. The view of FIG. 2A faces downwards towards the bottom end 128 of the insulated bag 110. The bottom panel 201 can be positioned at the bottom end 128. The bottom panel 201 can comprise two bottom subpanels 202 joined by a bottom seam 203. As shown in FIG. 3A the bottom seam 203 can be formed by attaching together opposing portions of the bottom border 305 of the blank border 440, and each opposing portion can extend across the bottom panel 201 from a first one of the side crease lines 116 to a second one of the side crease lines 116. In the present aspect, the bottom seam 203 can extend from one side panel 114 to the other side panel 114; in other aspects, the bottom seam 203 can extend from one main panel 112 to the other main panel 112. In some aspects, the bottom panel 201 can define a plurality of bottom seams 203. In other aspects, the bottom panel 201 may not comprise bottom subpanels 202 and instead can comprises a single panel, and the bottom seam 203 can be positioned at an intersection between the bottom panel 201 and a one of the main panels 112 or side panels 114. In other aspects, the bottom panel 201 may be comprised of a plurality of flaps 905A,B (as shown in FIG. 9) and may not define the bottom seam 203.

Figure 2B:
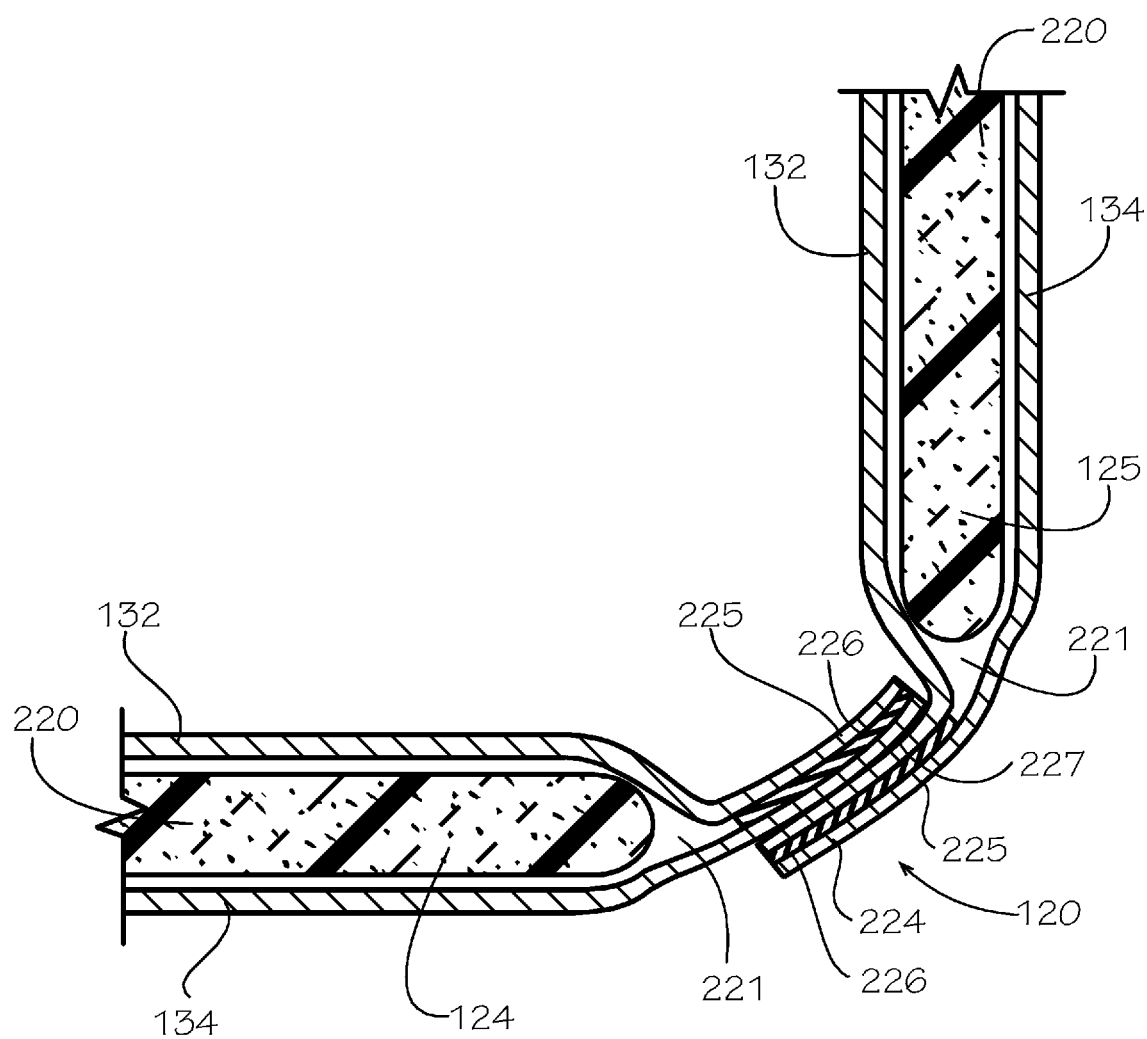
FIG. 2B is a detail view of a main seam of FIG. 2A taken from Detail 2B in FIG. 2A.

FIG. 2B is a detailed view of the main seam 120 shown in FIG. 2A. As shown, the first sheet 132 and the second sheet 134 can each extend beyond the insulation batt 220 at both the first end 124 and the second end 125 of the insulated blank 111. The perimeter portions of the first sheet 132 and the second sheet 134 extending beyond the insulation batt 220 at the first end 124 can be attached together to form the first end border 224. The first end border 224 can be a two-ply seam formed by overlapping portions of the first sheet 132 and the second sheet 134. Similarly, portions of the first sheet 132 and the second sheet 134 extending beyond the insulation batt 220 at the second end 125 can be attached together to form the second end border 225. The second end border 225 can be a two-ply seam formed by overlapping portions of the first sheet 132 and the second sheet 134. The main seam 120 can be a four-ply seam formed by overlapping portions of the first end border 224 and the second end border 225. The first end border 224 and the second end border 225 can each be defined by the blank border 440.

In the aspect shown, the first end border 224 and the second end border 225 can each be formed by attaching the first sheet 132 and the second sheet 134 together in facing engagement with a first adhesive 226. The first end border 224 and the second end border 225 can each be defined by the continuous blank border 440, and the first adhesive 226 can extend completely through the blank border 440. The first adhesive 226 can be a glue, cement, cohesive, epoxy, double-sided tape, or other adhesive. In some aspects, the first adhesive 226 can be a cohesive wherein the areas treated with the cohesive are configured to selectively adhere only to other areas treated with the cohesive. In such an embodiment, surfaces of the first sheet 132 and the second sheet 134 facing one another can each be selectively or entirely treated with cohesive, and only the treated areas positioned in facing engagement may adhere to one another. In some aspects, the first sheet 132 and the second sheet 134 can be attached through other methods such as taping, stitching, stapling, hemming, or other suitable attachment mechanisms.

The first end border 224 and the second end border 225 can be attached together to form the main seam 120. The first end border 224 can be attached to the second end border 225 with a second adhesive 227. The second adhesive 227 can be the same as the first adhesive 226, or the second adhesive 227 can be a different type of adhesive. The second adhesive 227 can be a glue, cement, cohesive, epoxy, double-sided tape, or other adhesive. In other aspects, the first end border 224 and the second end border 225 can be attached through other methods such as taping, stitching, stapling, hemming, or other suitable attachment mechanisms. In the present aspect, the main seam 120 can be a lap seam in which the first end border 224 and the second end border 225 overlap one another. In other aspects, the main seam can be a different type of seam such as a plain seam, or any other type of suitable seam.

FIG. 3A is cross-sectional view of another aspect of the insulated bag assembly 100. In the aspect shown, the insulated bag assembly 100 can comprise a plurality of insulated panels 190A-D. The insulated panels 190A-D can be the same as one another; however, in other aspects, the insulated panels 190A-D can vary in shape or size. In the present aspect, the insulated panels 190B-D can be sized slightly smaller than the insulated panel 190A in order to facilitate insertion into the bag cavity 130. The insulated bag assembly 100 can also comprise more or less insulated panels 190 than shown in FIG. 3A. Each insulated panel 190 can comprise a first blank sheet 332, a second blank sheet 334, and an insulation batt 391. A construction of the insulated panel 190 can be similar to a construction of the insulated blank 111. The first blank sheet 332 can be attached to the second blank sheet 334 around a perimeter of the insulated panel 190 which forms the panel border 192. The panel border 192 can enclose a panel cavity 321 between the first blank sheet 332 and the second blank sheet 334. The insulation batt 391 can be encapsulated within the panel cavity 321. A portion of the insulated panel 190 positioned inwards from the panel border 192 can define the panel insulated portion 191. In some aspects, a one of the insulated panels 190 can be attached to the insulated bag 110. For example and without limitation, a portion of the panel border 192 can be attached to a portion of the uninsulated bag lip 136 or the top border 137 to form a hinged top panel (not shown).

The insulated panel 190B can be positioned within the bag cavity 130 proximate the bag opening 131. Enclosing the bag cavity 130 with the insulated panel 190B can create an insulated cavity 329. In the aspect shown, the panel beveled edge 193 can be positioned against the bag beveled edge 152 to form the seal. The insulated panel 190C can be positioned within the bag cavity 130 between the top end 126 and the bottom end 128 in order to partition the bag cavity 130 into two subcavities 330A,B. The insulated panel 190B can form a seal with the inner surface 133. This configuration can be desirable in order to package and store contents at different temperatures. For example and without limitation, the subcavity 330A can be used to store warm contents while the subcavity 330B can be used to store cool contents. In other aspects, the insulated panel 190B can rest upon contents of the subcavity 330B.

In other aspects, the bag cavity 130 can be partitioned into more than two subcavities 330. In the present aspect, the insulated panels 190 are shown in a horizontal orientation partitioning the bag cavity 130 top-to-bottom; however in other aspects, the insulated panels 190 can be positioned in a vertical orientation which can partition the bag cavity 130 side-to-side, front-to-back, or diagonally (not shown). In some aspects, the insulated bag assembly 100 can comprise any number of insulated panels 190 in both horizontal and vertical configurations.

In the present aspect, the insulated panel 190D can be positioned atop the bottom panel 201 at the bottom end 128 of the insulated bag 110. The bottom panel 201 can be insulated, and the insulated panel 190 can be placed on top of the bottom panel 201. This configuration can provide additional insulation at the bottom end 128 of the insulated bag 110. Additional insulation at the bottom end 128 can be desirable in order to minimize conduction of heat through the bottom end 128 of the insulated bag 110, such as when the bottom end 128 of the insulated bag 110 is rested on a hot or cold environmental surface. In some aspects, the insulation batts 391 can be thicker or thinner than the insulation batt 220. In some aspects, the insulation batts 391 can be more or less dense than the insulation batt 220. In some applications, a more dense insulation batt 391 or insulation batt 220 can be desirable, such as when the bag cavity 130 contains heavy contents. More dense insulation can better resist compression which can degrade an insulation value of the batts 220,391.

In some aspects, the bottom panel 201 may not comprise insulation, and the insulated panel 190D can be positioned atop the bottom panel 201 to insulate the bottom end 128 of the insulated bag 110. This configuration can be desirable for reasons such as ease of manufacturing. In some aspects in which the insulation batt 220 defines a greater thickness, such as over ¾" thick, the insulation batt 220 can be difficult to bend about a pair of bottom crease lines 441 (shown in FIG. 4A) defined at intersections between the main panels 112 and the bottom subpanels 202. Providing insulation at the bottom end 128 with the separate insulated panel 190D can simplify manufacturing and assembly of the insulated bag 110 in some aspects.

Figure 3B:
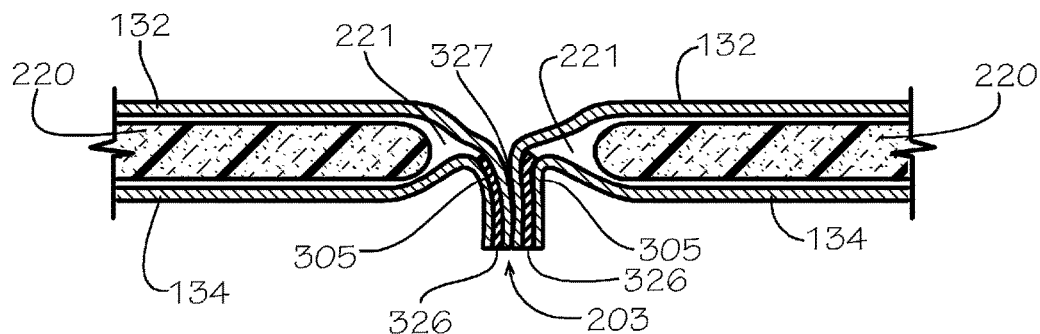
FIG. 3B is a detail view of the insulated bag assembly of FIG. 3A taken from Detail 3B in FIG. 3A.

As shown in FIG. 3B, the bottom seam 203 and the bottom border 305 can be formed similar to the main seam 120; however, the bottom seam 203 can be formed as a plain seam rather than as the lap seam of the main seam 120. The bottom border 305 can be a two-ply seam formed by overlapping portions of the first sheet 132 and the second sheet 134. The bottom seam 203 can be a four-ply seam formed by overlapping portions of opposing portions of the bottom border 305. In other aspects, the bottom seam 203 can be formed as the lap seam. In some aspects, the bottom seam 203 can be covered and reinforced by the tape strip 160 (not shown). The bottom border 305 can be formed by attaching the first sheet 132 and the second sheet 134 in facing engagement. In some aspects, the bottom border 305 can be formed by attaching the first sheet 132 and the second sheet 134 with a third adhesive 326 which can be a glue, cement, cohesive, epoxy, double-sided tape, or other adhesive. The third adhesive 326 can be the same as any of the first adhesive 226 or the second adhesive 227. In some aspects, the bottom border 305 can be attached together to form the bottom seam 203 by a fourth adhesive 327 which can be a glue, cement, cohesive, epoxy, double-sided tape, or other adhesive. The fourth adhesive 327 can be the same as any of the first adhesive 226, the second adhesive 227, or the third adhesive 326. In other aspects, the bottom border 305 can be attached together through other methods such as taping, stitching, stapling, hemming, or other suitable attachment mechanisms.

FIGS. 4A-E show perspective views of an assembly process for one aspect of the insulated bag 110. FIG. 4A is a perspective view of a first step 401 of the assembly process for one aspect of the insulated bag 110. The insulated blank 111 in a partially-folded configuration. A folded configuration can be suitable for storage and transportation of the insulated blank 111. The insulated blank 111 is shown folded across the side crease lines 116, and the main seam 120 and the bottom seam 203 have not been formed. The first end 124 and the second end 125 are positioned proximate to one another, but are not yet attached. The bottom subpanels 202 are also shown proximate to one another, but are not yet attached. The blank border 440 extends entirely around the perimeter of the insulated blank 111. The blank border 440 can be a two-ply seam formed from overlapping portions of the first sheet 132 and the second sheet 134. In the aspect shown, the top border 137 can be the uninsulated bag lip 136 which can extend outwards further than a one of the first end border 224, the second end border 225, or the bottom border. However, in some aspects, the top border 137 can extend outwards a distance equal to or less than the first end border 224, the second end border 225, and the bottom borders 305.

Figure 4C:
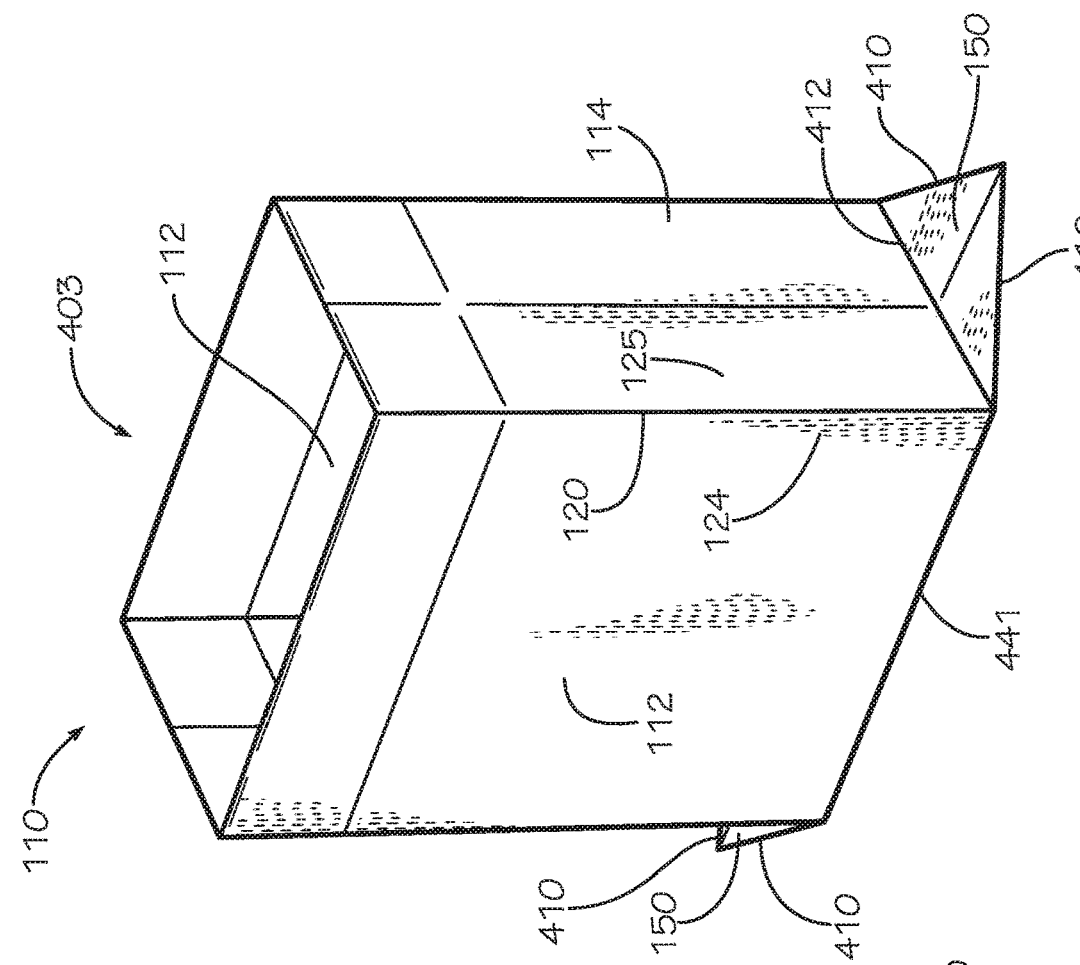
FIG. 4C is a perspective view of the insulated bag of FIG. 1 in a partially assembled position.
Figure 4B:
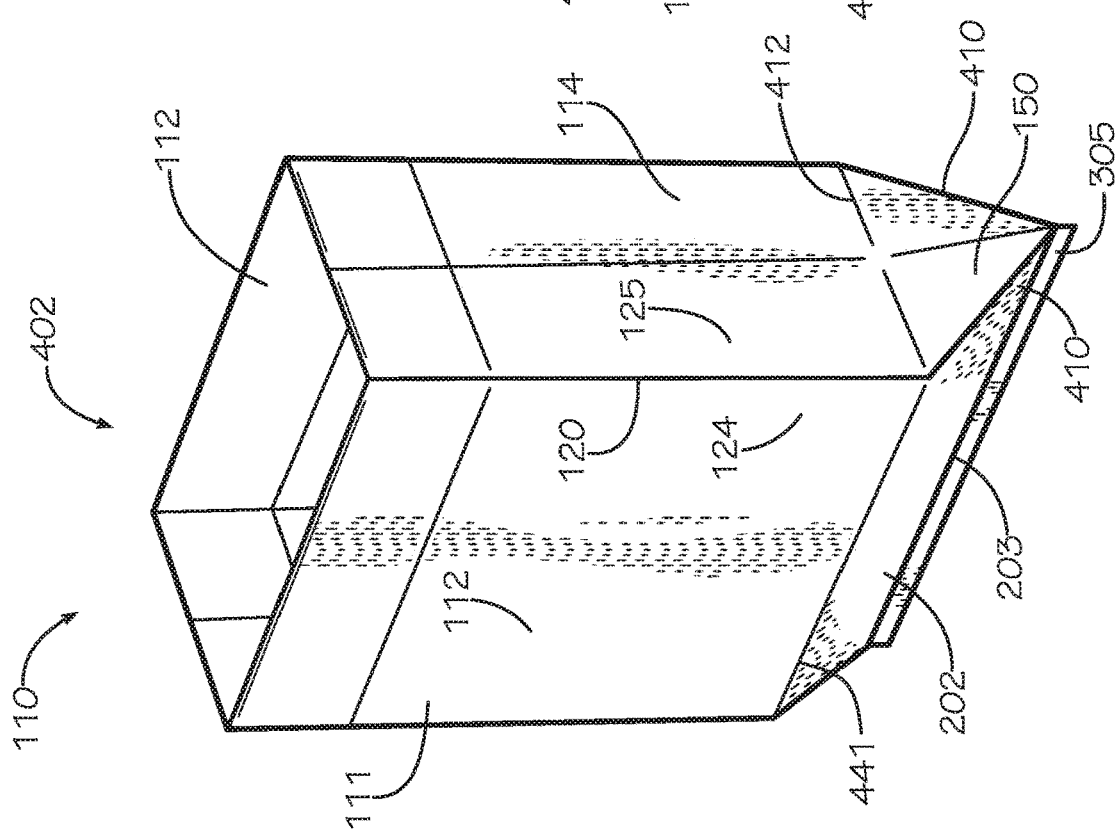
FIG. 4B is a perspective view of the insulated bag of FIG. 1 in a partially assembled position.

FIG. 4B is a perspective view of a second step 402 of the assembly process for one aspect of the insulated bag 110. In the second step 402, the insulated bag 110 is shown with the first end 124 and the second end 125 joined together at the main seam 120. Opposing portions of the bottom border 305 have been attached to form the bottom seam 203. The bottom panel 201 is partially folded across the bottom seam 203 and at the bottom crease lines 441. The intersection between each wing 150 and each side panel 114 can define a base wing crease line 412. A pair of sides of each wing 150 can define a pair of side wing crease lines 410. The wings 150 can extend slightly outwards from the side panels 114.

In some aspects, the configuration of the insulated bag 110 shown in FIG. 4B can be used as a finished product, such as an insulated sack, without a flat bottom. In such aspects, the bag opening 131, the main panels 112, and the side panels 114 can define an ovular, lens, biconvex, or elliptical cross-sectional shape rather than a substantially rectangular shape as shown. In such aspects, the main crease lines 122 can be excluded from insulated bag 110 such that each of the main panels 112 and the pair of adjacent side subpanels 144 can be continuous without folds or crease lines partitioning the side subpanels 144 from the main panels 112. In such aspects handles (not shown) can be attached proximate the bag opening 131 to allow a user to carry the insulated bag 110.

FIG. 4C is a perspective view of a third step 403 of the assembly process for one aspect of the insulated bag 110. The third step 403 shows the insulated bag 110 with the bottom panel 201 flattened across the bottom seam 203. The wings 150 can extend outwards from the insulated bag 110 substantially perpendicular to the side panels 114, though the wings 150 can be angled at other angles other than substantially perpendicular in other aspects. The wing 150 has been folded to an approximate 90-degree angle about the base wing crease line 412.

Figure 4E:
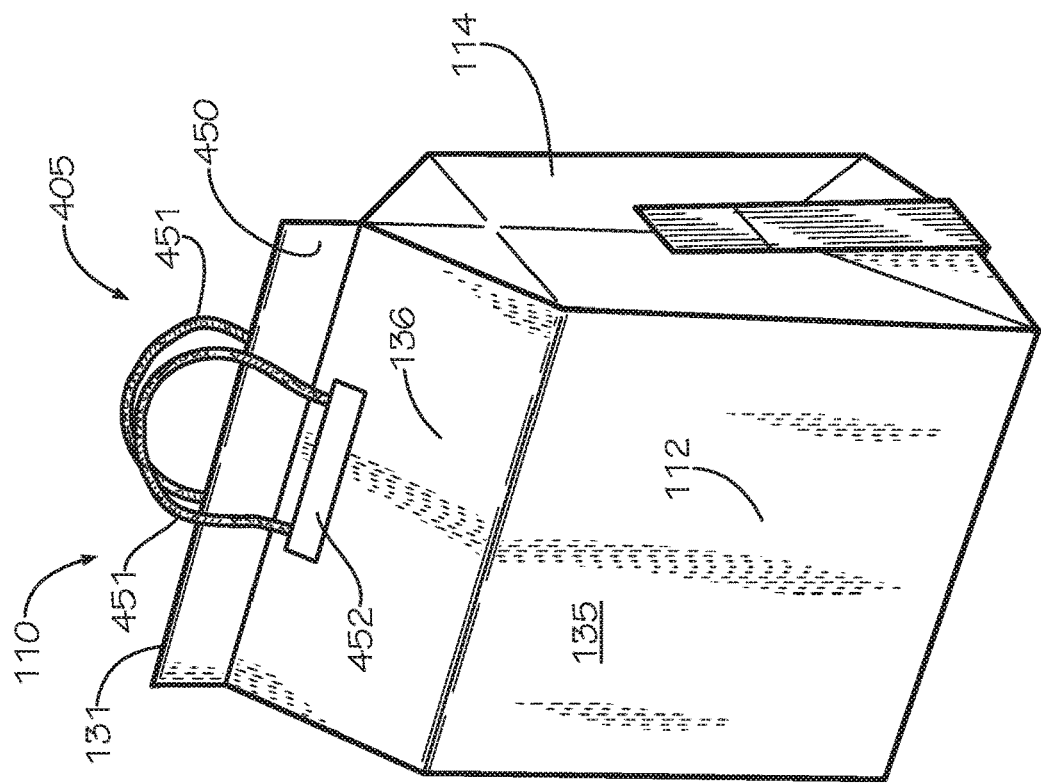
FIG. 4E is a perspective view of another aspect of the insulated bag in a sealed configuration.
Figure 4D:
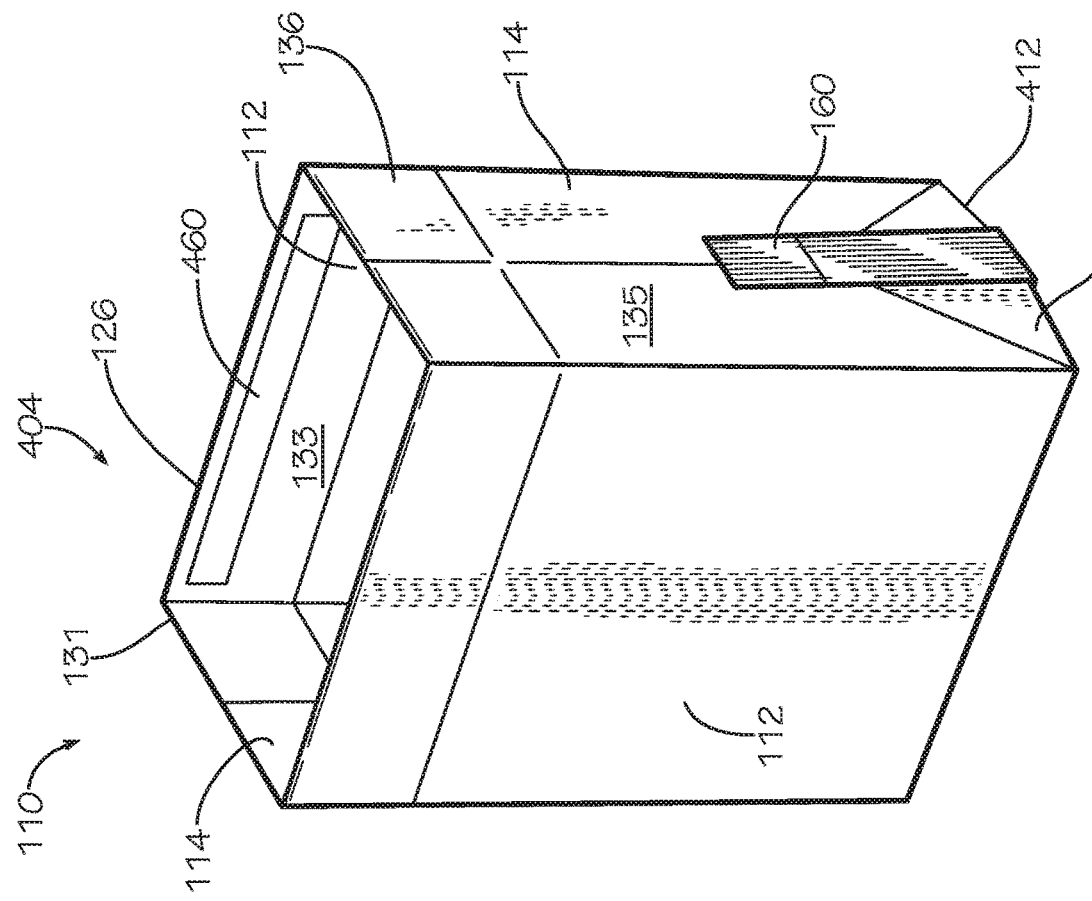
FIG. 4D is a perspective view of the insulated bag of FIG. 1 in an assembled position.

FIG. 4D is a perspective view of a fourth step 404 of the assembly process for one aspect of the insulated bag 110. The fourth step 404 shows the wings 150 further folded about the base wing crease lines 412 until each wing 150 can be positioned in facing engagement with the outer surface 135 of a one of the side panels 114. In this position, the wings 150 can be secured by the tape strip 160. The insulated bag 110 has thus been assembled but remains in an open configuration. In some aspects, the insulated bag 110 can further comprise an adhesive strip 460. In some aspects, the adhesive strip 460 can comprise an adhesive covered by a backing strip. A user can remove the backing strip to expose the adhesive. The adhesive can be used to attach portions of the insulated bag 110 in order to seal the bag opening 131. In the aspect shown, the adhesive strip 460 can be disposed on the inner surface 133 of the uninsulated bag lip 136; however in other aspects, the adhesive strip 460 can be disposed in a different location such as the inner surface 133 or outer surface 135 of a one of the side panels 114 or the main panels 112. In some aspects, the insulated bag 110 can comprise multiple adhesive strips 460.

FIG. 4E is a perspective view of another aspect of the insulated bag in a closed and sealed configuration. In an optional fifth step 405, two opposing portions of the uninsulated bag lip 136 can be attached together to seal the bag opening 131 and form a top seam 450. The top seam 450 can be formed by adhering the inner surfaces 133 of the uninsulated bag lip 136 together with the adhesive strip 460 shown in FIG. 4D. The insulated bag 110 can further comprise a pair of carry handles 451. The carry handles 451 can be comprised of rope or paper or any other suitable material. The carry handles 451 can be attached by a handle tape strip 452 for each carry handle 451 and which can secure the carry handles 451 to the insulated bag 110. In the aspect shown, the carry handles 451 can be secured to the outer surface 135 of the insulated bag 110. FIG. 4E shows only one configuration for sealing or carrying on aspect of the insulated bag 110 and should not be viewed as limiting.

Figure 5C:
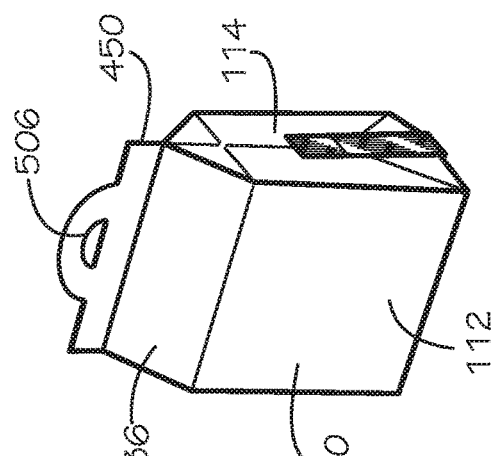
FIG. 5C is a perspective view of another aspect of the insulated bag comprising a seam handle.
Figure 5F:
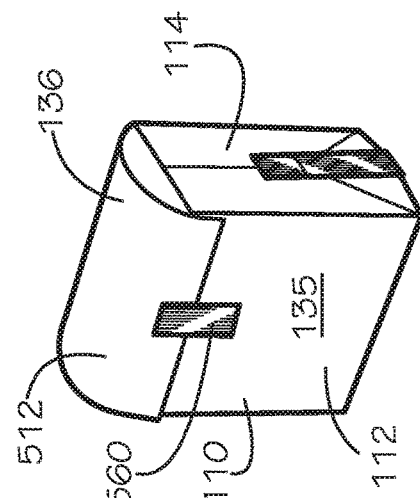
FIG. 5F is a perspective view of another aspect of the insulated bag sealed by a fold.
Figure 5B:
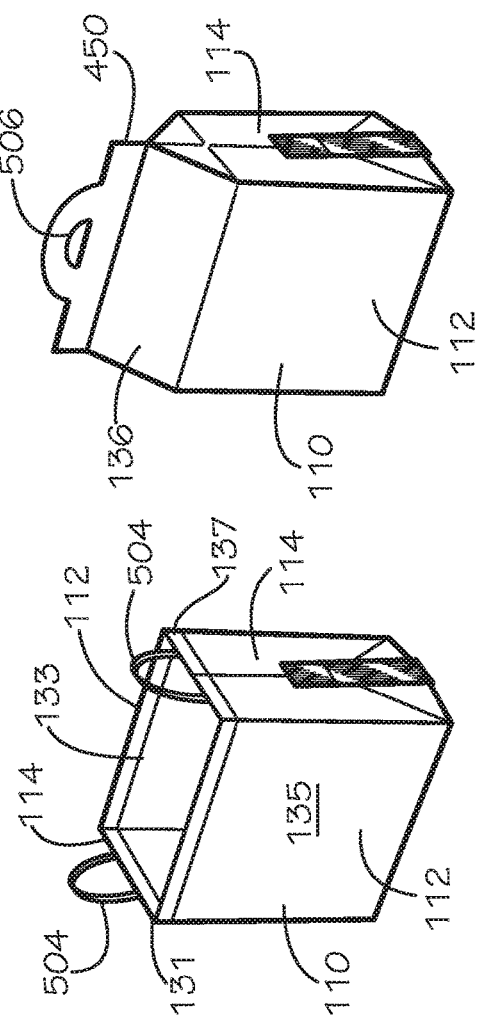
FIG. 5B is a perspective view of another aspect of the insulated bag comprising a pair of side handles.
Figure 5E:
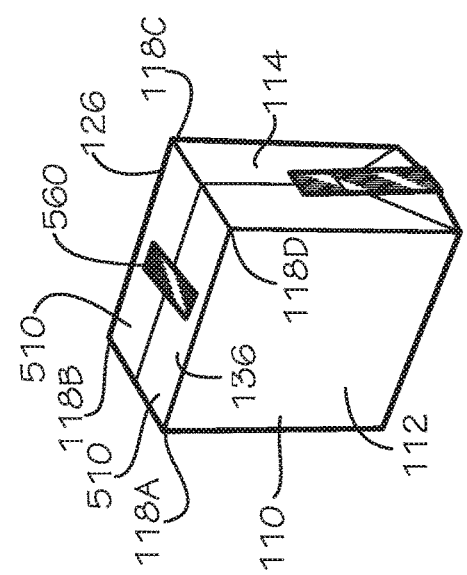
FIG. 5E is a perspective view of another aspect of the insulated bag comprising a plurality of flaps.
Figure 5A:
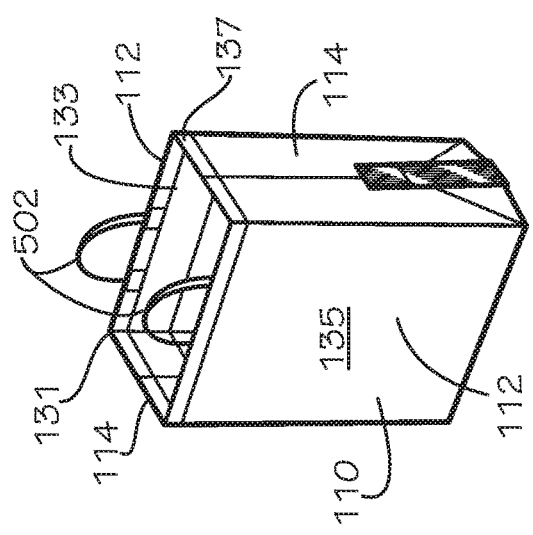
FIG. 5A is a perspective view of another aspect of the insulated bag comprising a pair of main handles.

FIGS. 5A-F show perspective views of various aspects of the insulated bag 110 depicting optional end-use configurations. The configurations shown should not be viewed as comprehensive or limiting. Any of the aspects shown can comprise one or more insulated panels 190. FIG. 5A is a perspective view of one aspect of the insulated bag 110 comprising a pair of main handles 502. The main handles 502 can be fixed to the opposing pair of main panels 112. The main handles 502 can be fixed to the inner surface 133 as shown or to the outer surface 135 of the main panels 112 proximate the bag opening 131. The main handles 502 can be configured to carry the insulated bag 110 and its contents. In the aspect shown, the main handles 502 are not configured to seal the bag opening 131. In such aspects, it can be desirable to position the insulated panel 190 proximate the bag opening 131 to further insulate the bag cavity 130.

FIG. 5B depicts an aspect similar to FIG. 5A. FIG. 5B is a perspective view of one aspect of the insulated bag 110 comprising a pair of side handles 504. The pair of side handles 504 can be fixed to the side panels 114 instead of the main panels 112, on either the inner surface 133 or the outer surface 135. The carry handles 451, the main handles 502, and the side handles 504 can each comprise a material such as paper, rope, plastic, or any other material. In some aspects, it can be desirable for the carry handles 451, the main handles 502, and the side handles 504 to comprise biodegradable, compostable, repulpable, or recyclable materials. In the aspects shown in FIGS. 5A and 5B, the top border 137 of the blank border 440 is not extended; however, some aspects comprising main handles 502 or side handles 504 can define the extended uninsulated bag lip 136 as shown in FIG. 4E.

FIG. 5C is a perspective view of one aspect of the insulated bag 110 comprising a seam handle 506. The aspect shown is similar to the aspect of FIG. 4E; however, the top seam 450 can be modified to comprise the seam handle 506. The seam handle 506 can be defined by the uninsulated bag lip 136 or the top border 137. In some aspects, the seam handle 506 can be formed by attaching opposing portions of the uninsulated bag lip 136 together with an adhesive.

Figure 5D:
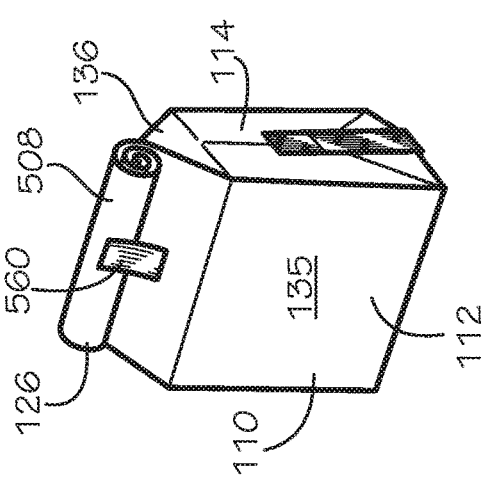
FIG. 5D is a perspective view of another aspect of the insulated bag sealed by a roll.

FIG. 5D is a perspective view of one aspect of the insulated bag 110 sealed by a roll 508. In some aspects, opposing portions of the uninsulated bag lip 136 can be rolled together to form the roll 508. In the present aspect, the roll 508 can be secured with a tape strip 560 attaching the roll 508 to the outer surface 135. In some aspects, the roll 508 can be secured by stapling the roll 508. In other aspects, the adhesive strip 460 (not shown) can be disposed on the outer surface 135 proximate the top end 126. The adhesive strip 460 can be configured to adhere to the roll 508 to secure the roll 508 to the outer surface 135 of the insulated bag 110.

FIG. 5E is a perspective view of one aspect of the insulated bag 110 comprising a plurality of flaps 510. The flaps 510 can be positioned proximate the top end 126. In the aspect shown, the flaps 510 can be defined by the uninsulated bag lip 136; however in other aspects, the flaps 510 can be insulated. In some aspects, the uninsulated bag lip 136 can be cut at each of the corners 118A-D to define four separate flaps 510. In the aspect shown, two flaps (not shown) connected to the side panels 114 can be underlying two flaps 510 connected to the main panels 112. The main panels 112 can be sealed with the tape strip 560. In some aspects, the bottom end 128 and the bottom panel 201 can be similarly constructed, and the bottom panel 201 can comprise a plurality of flaps 510.

In some aspects, the corners 118 may not be cut, and the portions of the uninsulated bag lip 136 proximate the sides can be folded inwards to form the flaps 510 connected to the main panels 112. The flaps 510 can then be folded inwards and attached to one another. In some aspects, the flaps 510 can be defined by the main panels 112 and the side panels 114 and can be insulated as shown in FIG. 9. In some aspects, one of the flaps 510 can comprise the adhesive strip 460 defined on the inner surface 133 or the outer surface 135 with can be configure to attach an overlapping portion of the flaps 510. The configuration shown in FIG. 5E can be desirable, for example, in applications in which the insulated bag 110 is to be positioned within another container, such as a cardboard box, when shipping the insulated bag 110. The configuration provides the insulated bag 110 with a shape of a rectangular prism which compliments a shape of many commonly available cardboard boxes. However; any of the aspects of insulated bags 110 shown can be positioned within another container or used for applications such as shipping of the insulated bags 110.

FIG. 5F is a perspective view of one aspect of the insulated bag 110 sealed by a fold 512. The opposing portions of the uninsulated bag lip 136 can be positioned together in facing engagement, and the uninsulated bag lip 136 can be folded over a one of the main panels 112 to form the fold 512. The fold 512 can seal the bag opening 131. In the aspect shown, the fold 512 can be secured to the outer surface 135 with the tape strip 560. In some aspects, a portion of the outer surface 135 can define the adhesive strip 460 configured to secure the fold 512.

Figure 6:
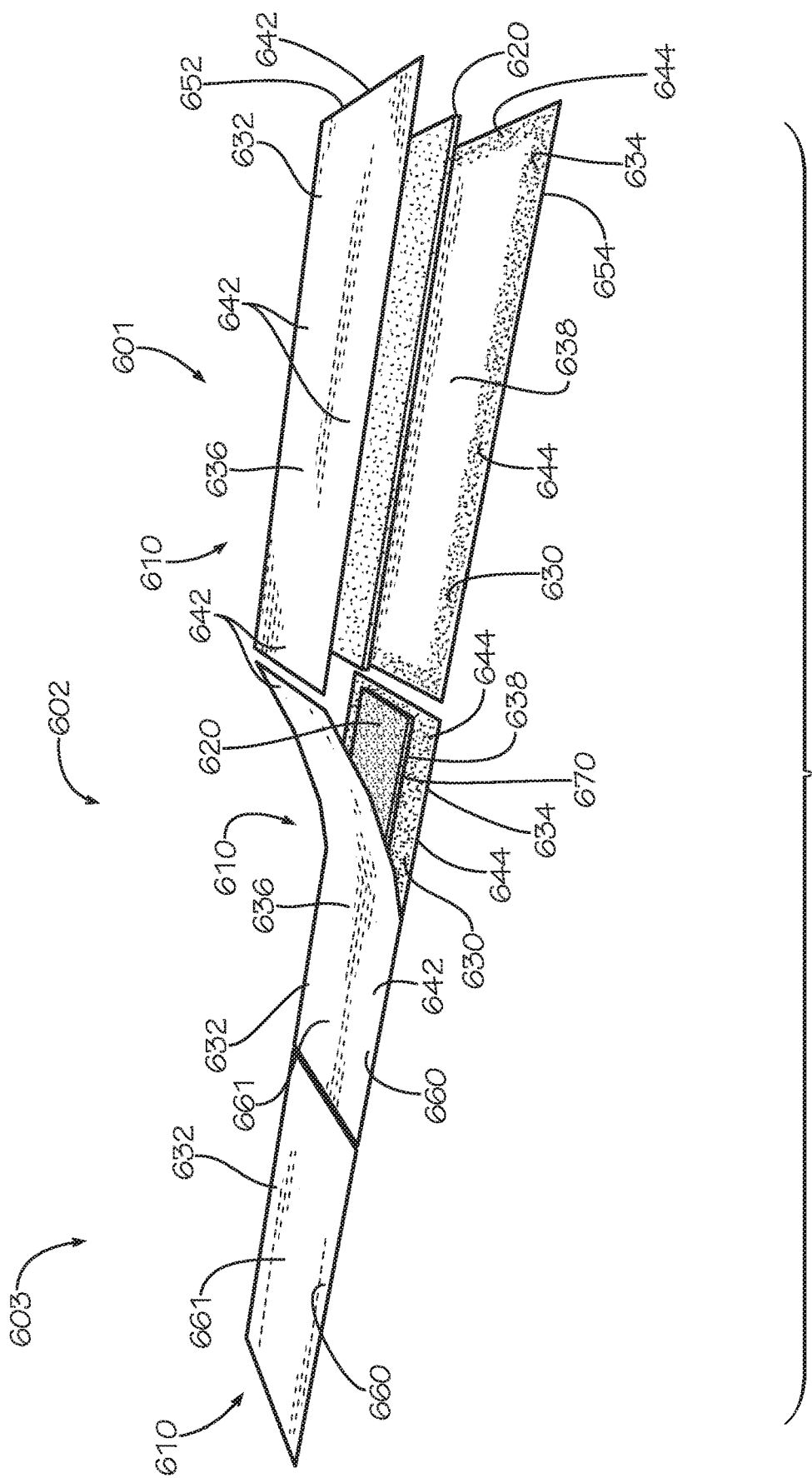
FIG. 6 is a perspective view of a method of manufacturing for an insulated blank.

FIG. 6 is a perspective view of a method of manufacturing for an insulated blank 610. The method can apply to the manufacture of either the insulated blank 111, the insulated panels 190, or any other insulated blank, and the insulated blank 610 can be the insulated blank 111 or the insulated panel 190. In a step 601, an insulation batt 620 can be positioned between a first sheet 632 and a second sheet 634. The first sheet 632 and the second sheet 634 can be sized and shaped complimentary to each other; however in some aspects, the sheets 632,634 can differ in size and shape. The insulated blank 610, the insulation batt 620, and the sheets 632,634 can each be flat and substantially planar before assembly.

The first sheet 632 can define a first outer edge 652, and portions of the first sheet 632 proximate the first outer edge 652 can define a first perimeter portion 642. The second sheet 634 can define a second outer edge 654, and portions of the second sheet 634 proximate the second outer edge 654 can define a second perimeter portion 644. The sheets 632,634 can be sized to overhang the insulation batt 620 on all sides with the first perimeter portion 642 and the second perimeter portion 644 extending beyond the insulation batt 620. The first perimeter portion 642 can encompass a first interior portion 636 of the first sheet 632, and the second perimeter portion 644 can encompass a second interior portion 638 of the second sheet 634. The interior portions 636,638 can be sized and shaped complimentary to the insulation batt 620.

Surfaces of the sheets 632,634 facing one another can be treated in or with a fifth adhesive 630 such as a cohesive. In various aspects, the adhesive can be a glue, epoxy, cement, double-sided tape, or other suitable adhesive. In some aspects, the fifth adhesive 630 can be the same as any of the first adhesive 226, the second adhesive 227, the third adhesive 326, or the fourth adhesive 327. The surfaces can be entirely treated with the fifth adhesive 630 or selectively treated with the fifth adhesive 630. In the aspect shown, the perimeter portions 642,644 can be selectively treated with the fifth adhesive 630. In some aspects, the insulation batt 620 can also be adhered to the interior portions 636,638 of the sheets 632,634.

In a step 602, the sheets 632,634 can be aligned and positioned in facing engagement wherein the first perimeter portion 642 can be attached to the second perimeter portion 644 by the fifth adhesive 630. The insulation batt 620 can be aligned between the interior portions 636,638. Attaching the perimeter portions 642,644 can form a border portion 660 of the insulated blank 610. The border portion 660 can seal the insulation batt 620 within a blank cavity 670 defined between the interior portions 636,638 of the sheets 632,634, respectively. Portions of the insulated blank 610 containing the insulation batt 620 can define insulated portions 661. In some aspects, the insulation batt 620 can be aligned off-center from the sheets 632,634 wherein the border portion 660 can extend outwards further in some areas than others. Off-center alignment can form features such as the uninsulated bag lip 136 where in some aspects, the top border 137 of the insulated blank 111 can be extended proximate the top end 126. Off-center alignment can also provide for aspects wherein the bottom panel 201 can be uninsulated and defined by the border portion 660 rather than the insulated portion 661.

In a step 603, the first perimeter portion 642 has been fully attached to the second perimeter portion 644, thereby forming the completed border portion 660. Manufacturing of the insulated blank 610 is thus completed; however in some aspects, the method can comprise additional steps such as cutting slots into the border portion 660 as shown in FIG. 9. The border portion 660 can fully encapsulate the blank cavity 670; however in some aspects, the insulation batt 620 may not be fully encapsulated. In some aspects, the insulation batt 620 can define a complex shape which can comprise curves, notches, cutouts, or other features which can be reflected by complimentary shapes of the border portion 660 and the insulated portion 661. Similar to the insulation batt 220, the insulation batt 620 can also define one or more grooves 760 (as shown in FIG. 7B) configured to enhance flexibility of the insulated blank 610.

In other aspects, the insulated blank 610 may not comprise the border portion 660 fully encompassing the insulated blank 610. In some aspects, some portions of the perimeter may expose an unfinished edge in which the insulation batt 620 is exposed. In some aspects, the insulated blank 610 may not define the border portion 660 on any portion of the perimeter of the insulated blank 610, and the entire perimeter can define an unfinished edge. In such aspects, the insulated blank 610 can comprise pre-laminated paper and each of the sheets 632,634 can be attached in facing contact with the insulation batt 620 with, for example and without limitation, an adhesive. In some aspects in which the insulated blank 610 defines the border portion 660, the insulation batt 620 can also be attached in facing contact with one or both of the sheets 632,634. In some aspects, the pre-laminated paper can be provided in a roll, and the insulated blanks 610 can be cut to size from the roll.

Figure 7C:
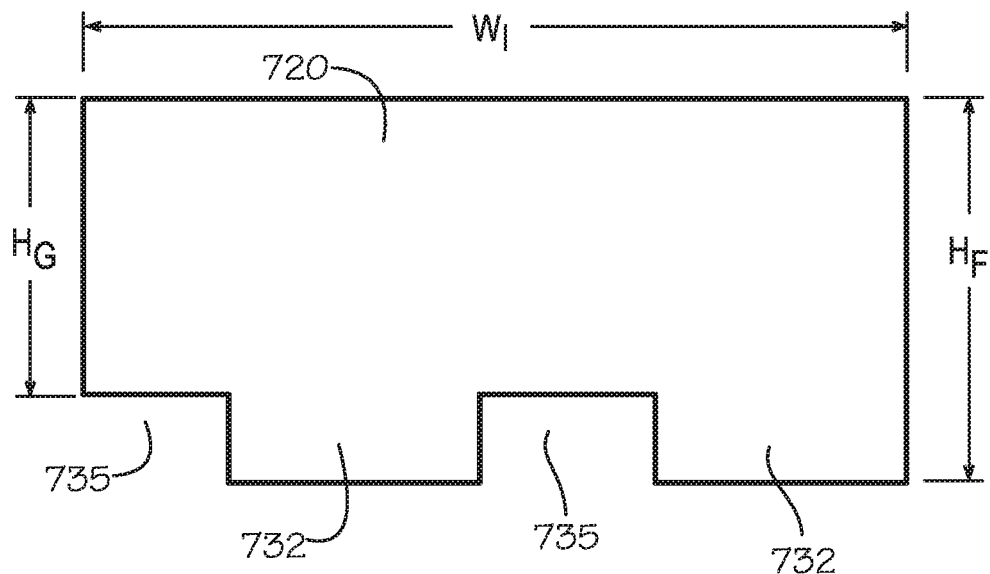
FIG. 7C is a top view of another aspect of the insulation batt comprising a pair of bottom subpanel extensions.

FIG. 7A-D show top views of aspects of a blank sheet 711 and various aspects of an insulation batt 720. FIG. 7A is a top view of the blank sheet 711. The blank sheet 711 can be, for instance, the first sheet 132 or the second sheet 134 of the insulated bag 110. The blank sheet 711 defines a top border portion 727, a body portion 791, a bottom portion 792, a first end border portion 723, a second end border portion 728, and a bottom border portion 705. The blank sheet 711 can further define a plurality of crease lines 716,722,741 which can correspond to the side crease lines 116, the main crease lines 122, and the bottom crease lines 441, respectively. The top border portion 727 can extend across the blank sheet 711 from a first end 724 to a second end 725 and define a width $W_A$. The top border portion 727 can define a height $H_A$. In the aspect shown, the top border portion 727 can be extended, and the height $H_A$ is be larger than a height HD defined by the bottom border portion 705. In such aspects, the top border portion 727 can be a uninsulated lip portion 726. For example and without limitation, the height $H_A$ can be greater than 1", and the height HD can be equal to or less than 1". The first end border portion 723 and the second end border portion 728 can each define a width $W_F$ which can have a value similar to height HD of the bottom border portion 705.

An extended top border portion 736 can be desirable for aspects in which the corresponding insulation batt 720 is thick and less flexible or in applications in which the corresponding uninsulated bag lip 136 can be configured to seal the bag opening 131 as shown in FIG. 5C, 5D, or 5F. Such aspects can benefit from the increased flexibility which can be offered by the extended uninsulated bag lip 136.

The body portion 791 can extend from the first end 724 to the second end 725, also defining the width $W_A$. The top border portion 736 and the body portion 791 can together define a pair of side portions 714 and a pair of main portions 712 which can correspond to the side panels 114 and the main panels 112 of the insulated bag 110. The body portion 791 can define a height $H_B$ and is positioned between the top border portion 736 and the bottom portion 792. The side portions 714 can define a width $W_B$, and the main portions 712 can define a width $W_C$. In the present aspect, one of the main portions 712 can be positioned at the first end 724, corresponding to the first end 124, and one of the side portions 714 can be positioned at the second end 725, corresponding to the second end 125, and the blank sheet 711 can be configured to form the main seam 120 positioned between one of the side panels 114 and one of the main panels 112.

The bottom portion 792 can define a height $H_C$. The bottom portion 792 can define a pair of bottom subpanel portions 702 and a pair of wing portions 751. The bottom subpanel portions 702 can correspond to the bottom subpanels 202, and the wing portions 751 can correspond to the wings 150. Each wing portion 751 can be divided into a pair of lower wing portions 706 and a pair of upper wing portions 704. When assembled into the insulated bag 110, the upper wing portions 704 can be in facing engagement with the side panels 114, and the lower wing portions 706 can face outwards from the insulated bag 110 and can be covered by the tape strip 160.

FIG. 7B is a top view of one aspect of the insulation batt 720. The insulated batt 720 can define a width $W_H$ and a height $H_E$. Similar to the process shown in FIG. 6, the insulated batt 720 can be encapsulated between a pair of the blank sheets 711 to form the insulated blank 111. The top border portions 727, the first end border portions 723, the second end border portions 728, and the bottom border portions 705 can be attached together respectively to seal the insulated batt 720 within a blank cavity similar to the blank cavity 670. The insulated batt 720 can define a thickness (not shown) which can range from less than 1⁄16" to over 2". In the present aspect, the preferred thickness range can be from less than 1" to over 1.5". In aspects in which the thickness is relatively thin, such as 1/16" to 1/4", the width $W_H$ can be substantially a value equal to the value of a width $W_K$. The width $W_K$ corresponds to a width of the blank sheet 711 less the width of the first end border portion 723 and the width of the second end border portion 728 (width $W_A$ less both the widths $W_F$). In aspects in which the thickness is larger, such as over 1/2", the width $W_H$ can be slightly smaller than the width $W_K$, for example and without limitation 1" less, to allow clearance within the blank cavity for the insulation batt 720.

In the aspect shown, the height $H_E$ of the insulation batt 720 can be sized to cover only the body portion 791, and can be substantially the same as or slightly less, for example and without limitation 1" less, than the value of height $H_B$ of the body portion 791. This configuration can be desirable in aspects in which the thickness of the insulation batt 720 is greater than 1/2". In such aspects, the bottom panel 201 is uninsulated and can be covered by the insulated panel 190.

Alternatively, the insulation batt 720 can be sized to cover both the body portion 791 and the bottom portion 792, and the corresponding insulated bag 110 can comprise insulated side panels 114, insulated main panels 112, insulated wings 150, and the insulated bottom panel 201. In this configuration, the insulated wings 150 can comprise two layers of insulation: a first layer corresponding to the upper wing portions 704 and a second layer corresponding to the lower wing portions 706. The first layer and the second layer can overlap one another when the wings 150 are formed. In such aspects, the height $H_E$ can have a value similar or slightly less than the combined value of heights $H_B$ and $H_C$. This configuration can be suited for applications in which the insulation batt 720 defines the thickness equal to 1/4" or less; however, this configuration can be used with thickness greater than 1/4".

The thickness of the insulation batt 720 can affect how flexible the insulation batt 720 may be with greater thickness values generally being less flexible and smaller thickness values generally being more flexible. With greater thickness values, the insulation batt 720 can be difficult to fold, particularly when forming the wings 150 from the wing portions 751 and when folding the bottom subpanels 202 relative to the main panels 112.

The flexibility of the insulation batts 220,391,620,720 can be increased by modifying the insulation batts 220,391,620, 720, such as by forming grooves 760 into the insulation batt 220,391,620,720 as shown in FIG. 7B. The grooves 760 can locally reduce a thickness of the insulation batt 220,391, 620,720. Each groove 760 can render the insulation batt 720 more flexible when folding about the groove 760. In the present aspect, each of the grooves 760 can correspond to a different one of the main crease lines 122. The grooves 760 can be configured to increase the flexibility between the side panels 114 and the main panels 112 of the insulated bag 110. In some aspects, the grooves can be configured to align with the side crease lines 116, the bottom crease lines 441, or any other crease lines defined by the insulated blank 111 or the insulated panels 190. In some aspects, the insulation batt 720 may not define grooves 760. Each of the grooves 760 can be cut or shaped into the insulation batt 220 and can reduce a thickness of the insulation batt 220,391,620,720 at a location of the groove 760. Each groove 760 can define a V-shape; however, the grooves 760 can define other shapes such as semicircular or any other shape.

FIG. 7C is a top view of one aspect of the insulation batt 720 comprising a pair of bottom subpanel extensions 732.

The bottom subpanel extensions 732 can correspond to the bottom subpanel portions 702, and a pair of wing notches 735 can correspond to the wing portions 751. The insulation batt 720 can define a width $W_I$ with a value similar to or slightly less than the width $W_K$. The portions of the insulated batt 720 defining the bottom subpanel extensions 732 can define a height $H_F$ with a value similar to or slightly less than the combined value of heights $H_B$ and $H_C$. The portions of the insulated batt 720 corresponding to the wing notches 735 can define a height $H_G$ with a value equal to or slightly less than the height $H_B$.

The insulated bag 110 formed from the blank sheets 711 and the insulated batt 720 of FIG. 7C can comprise insulated main panels 112, insulated side panels 114, and an insulated bottom panel 201 with uninsulated wings 150. Such a configuration can be desirable to allow for the use of a thicker insulation batt 720 because the configuration obviates the challenges of forming the wings 150 from the wing portions 751 when a less flexible insulation batt 720 is used, for instance. Additionally in some aspects, the insulation in the wings 150 can be unnecessary because the wings 150 can be secured to the outer surface 135 of the insulated side panels 114, rendering the insulation of the wings 150 redundant to insulation of the side panels 114.

Figure 7D:
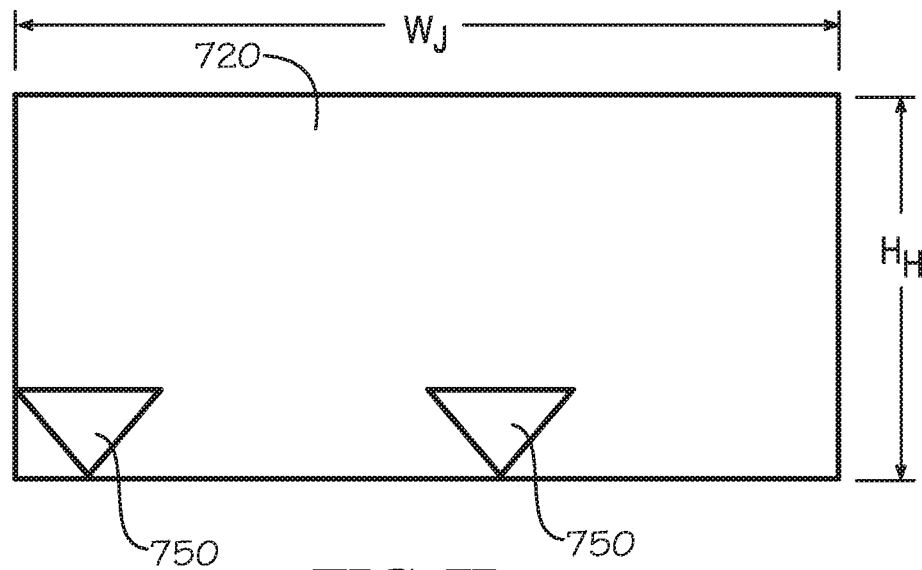
FIG. 7D is a top view of another aspect of the insulation batt defining a pair of wing holes.

FIG. 7D is a top view of on aspect of the insulation batt 720 defining a pair of wing holes 750. The wing holes 750 can correspond to the upper wing portions 704. Alternatively, the wing holes 750 can be formed to correspond to the lower wing portions 706. The wing holes 750 can be formed by removing material from the insulation batt 720, such as by die cutting the insulation batt 720. In this aspect, the insulation batt 720 can define a height $H_H$ with a value similar to or slightly less than the combined value of heights $H_B$ and $H_C$. The insulation batt 720 can define a width $W_I$ with a value similar to or slightly less than the width $W_K$. The insulated bag 110 formed from the blank sheets 711 and the insulation batt 720 of FIG. 7D can comprise insulated side panels 114, insulated main panels 112, the insulated bottom panel 201, and wings 150 wherein only a lower portion of the wing 150 corresponding to the lower wing portions 706 is insulated. An upper portion of each wing 150 corresponding to a one of the upper wing portions 704 can be uninsulated. Such a configuration can also be desirable for larger insulation thicknesses as the configuration eliminates one of the layers of insulation in the wings 150 which can make the wings 150 more flexible.

Figure 8:
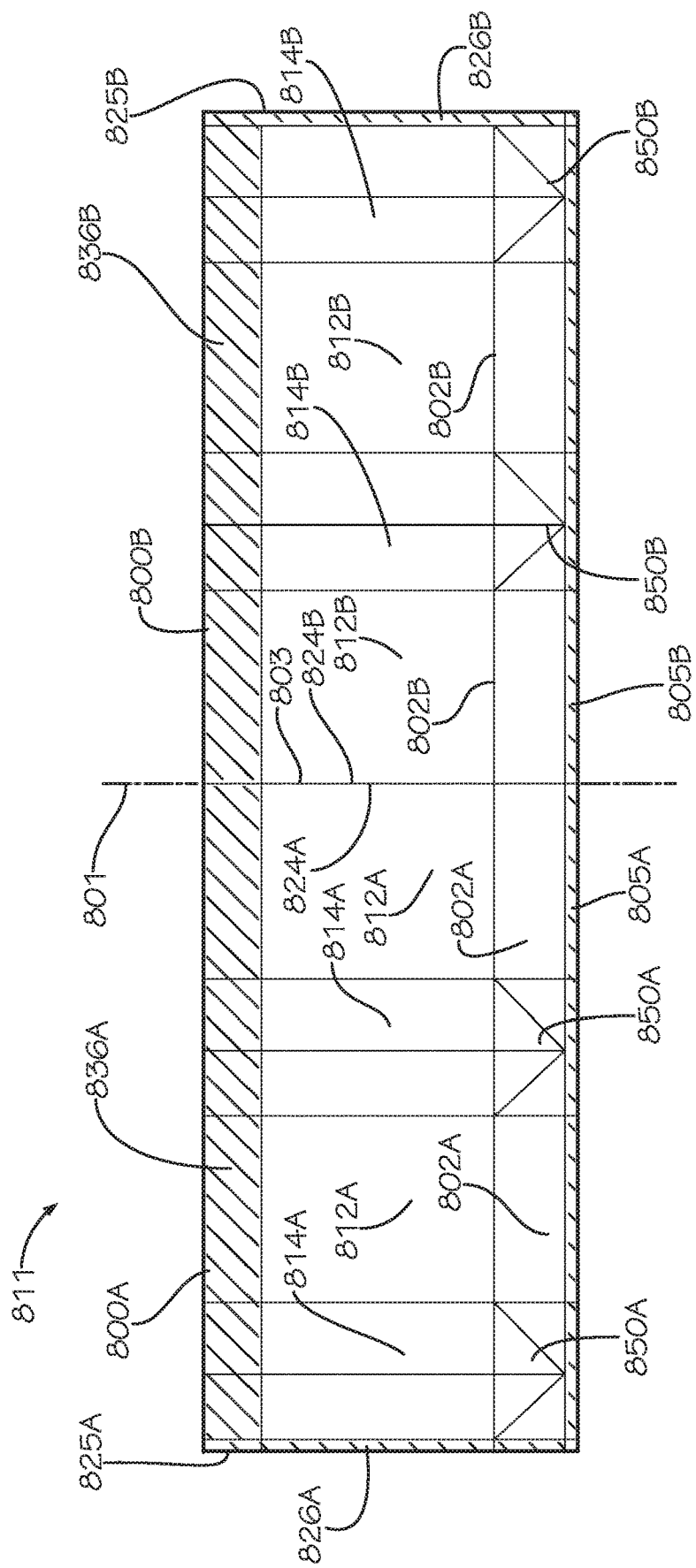
FIG. 8 is a top view of a double blank sheet.

FIG. 8 is a top view of a double blank sheet 811. The double blank sheet 811 can be similar to the blank sheet 711; however rather than attaching a first sheet 632 to a blank sheet 634 to form an insulated blank as shown in FIG. 6, the double blank sheet 811 is configured to fold in half about an axis 801 to encapsulate an insulation batt and form an insulated blank. A secondary portion 800B is configured to fold over to attach to a primary portion 800A. Once folded, a pair of first end portions 824A,B can define a first end (not shown) at a crease line 803, and a pair of second end portions 825A,B can be attached to form a second end (not shown). The primary portion 800A and the secondary portion 800B of the double blank sheet 811 can be substantially mirrored across the axis 801. A pair of primary side panel portions 814A and a pair of primary main panels 812A are configured to align with a pair of secondary side panel portions 814B and a pair of secondary main panels 812B, respectively, when the double blank sheet 811 is folded in half at the crease line 802. Similarly, a pair of primary bottom subpanel portions 802A and a pair of primary wing portions 850A are configured to align with a pair of second bottom subpanel portions 802B and a pair of secondary wing portions 850B, respectively, when the double blank sheet 811 is folded in half at the crease line 803.

Once folded, a primary top border portion 836A can be attached in facing engagement with a secondary uninsulated lip portion 836B, a primary second end border portion 826A can be attached in facing engagement with a secondary second end border portion 826B, and a primary bottom border portion 805A can be attached in facing engagement with a secondary bottom border portion 805B in order to form a blank cavity configured to encapsulate an insulation batt 720 aspects shown in FIGS. 7B-D, by placing the insulation batt 720 on the corresponding portions of the primary portion 800A and then folding the double blank sheet about the crease line 803 to encapsulate the insulation batt 720.

FIG. 9 is a perspective view of a method of assembling one aspect of an insulated bag 910 comprising flaps 510. In a step 901, an insulated blank 911 lays in an unfolded position. The insulated blank 911 can be similar in composition and construction to the insulated blank 610 with a plurality of slots cuts 909 and a pair of end cuts 912 defined into the insulated blank 610. The slot cuts 909 can be defined into a top blank end 926 to form a first plurality of flaps 510 which can be a plurality of top flaps 904A,B. A pair of top flaps 904A can be configured to oppose each other in an assembled configuration shown in step 903, and a pair of top flaps 904B can be configured to oppose each other in the assembled configuration. The slot cuts 909 can be defined into a bottom blank end 928 to form a second plurality of flaps 510 which can be a plurality of bottom flaps 905A,B. A pair of bottom flaps 905A can be configured to oppose each other in the assembled configuration, and a pair of bottom flaps 905B can be configured to oppose each other in the assembled configuration.

A body portion 931 can extend from a first end 924 to a second end 925 of the insulated blank 911, between the top flaps 904 and the bottom flaps 905. A pair of main crease lines 933 can extend between the body portion 931 and the top flaps 904 and between the body portion 931 and the bottom flaps 905. A plurality of side crease lines 932 can be defined extending between aligned slots cuts of the top blank end 926 and the bottom blank end 928. The insulated blank 911 can also define the pair of end cuts 912 at the first end 924 of the insulated blank 911. The end cuts 912 can define an end connection tab 927, and an end crease line 930 can be defined extending between the end cuts 912.

Each slot cut 909 and end cut 912 can extend through a top sheet, a bottom sheet, and an insulation batt 920 of the insulated blank 911. In the aspect shown, the insulation batt 920 can be exposed at some or all of the slot cuts 909 and the end cuts 912. In other aspects, a blank border 940 can be shaped complimentary to the slots cuts 909 and the end cuts 912, and the blank border 940 can fully enclose the insulation batt 920.

In a step 902 of the method, the insulated blank 911 can be folded along each of the side crease lines 932 and the end crease line 930 to align the end connection tab 927 of the first end 924 with the second end 925 of the insulated blank 911. In the present aspect, the end connection tab 927 can comprise the adhesive strip 460 which can be configured to attach the first end 924 to the second end 925, thereby forming a bag body 950. The top blank end 926 and the bottom blank end 928 of the insulated bag 910 can remain open at step 902.

In a step 903 of the method, the bottom blank end 928 can be sealed by folding a first pair of opposing bottom flaps 905A towards the bag body 950 formed by the body portion 931, and then folding a second pair of opposing bottom flaps 905B towards the bag body 950 to overlap the first opposing bottom flaps 905A. The bottom flaps 905 can then be secured in place with a tape strip 960. The top blank end 926 can similarly be sealed by folding a first pair of opposing top flaps 904A towards the bag body 950, and then folding a second pair of opposing top flaps 904B towards the bag body 950 to overlap the first opposing top flaps 904A.

In the present aspect, the sheets 132,134,332,334,634, 634,711,811 can comprise paper, such as kraft paper; however, in other embodiments, the sheets can comprise posterboard, cardboard, plastic sheeting, cloth, or any other suitable material. In some aspects, the sheets can comprise a water-proof or water-resistant material, such as waterproof paper. In some aspects, a one of the sheets 132,134, 332,334,634,634,711,811 of the insulated bag assembly 100 can comprised a material different from another of the sheets 132,134,332,334,634,634,711,811. The insulation batts 220, 391,620,720 can comprise paper or other paper fiber materials; however, in other aspects, the insulation batts can comprise cotton, foam, rubber, plastics, fiberglass, mineral wool, or any other flexible insulation material. In the present application, the insulation batts can be repulpable. In the present aspect, the insulated bag assembly 100 can be 100% recyclable. In the present aspect, the insulated bag assembly 100 can be single-stream recyclable wherein all materials comprised by the insulated bag assembly 100 can be recycled by a single processing train without requiring separation of any materials or components of the insulated bag assembly 100. In the present aspect, the insulated bag assembly 100 can be compostable. In the present aspect, the insulated bag assembly 100 can be repulpable. In the present aspect, insulated bag assembly 100 and each of the insulated bag 110 and the insulated panels 190 can be repulpable in accordance with the requirements of the Aug. 16, 2013, revision of the "Voluntary Standard For Repulping and Recycling Corrugated Fiberboard Treated to Improve Its Performance in the Presence of Water and Water Vapor" provided by the Fibre Box Association of Elk Grove Village, Ill. which is hereby incorporated in its entirety. In the present aspect, insulated bag assembly 100 and each of the insulated bag 110 and the insulated panels 190 can be recyclable in accordance with the requirements of the Aug. 16, 2013, revision of the "Voluntary Standard For Repulping and Recycling Corrugated Fiberboard Treated to Improve Its Performance in the Presence of Water and Water Vapor" provided by the Fibre Box Association of Elk Grove Village, Ill.

Recyclable and repulpable insulation materials are further described in U.S. Patent Application No. 62/375,555, filed Aug. 16, 2016, U.S. Patent Application No. 62/419,894, filed Nov. 9, 2016, and U.S. Patent Application No. 62/437, 365, filed Dec. 21, 2016, which are each incorporated by reference in their entirety herein.

The insulated bag assembly 100 can be used in applications in which a user or mail carrier transports perishable or temperature-sensitive goods. For example and without limitation, the insulated bag assembly 100 can be used to transport groceries. The insulated bag assembly 100 can improve upon a common plastic grocery bag by providing insulation to prevent spoilage of the contents.

Common plastic grocery bags are not accepted by many recycling facilities or curb-side recycling programs in which a waste management service collects recyclables at a user's home. Consequently, many common plastic grocery bags are deposited in landfills where the plastic grocery bags decompose very slowly, sometimes over the course of several centuries. In some instances, plastic grocery bags can enter the oceans where the plastic grocery bags can remain for years and harm marine life. In some aspects, the insulated bag assembly 100 can reduce waste and pollution by comprising materials which are recyclable or biodegradable. In aspects in which the insulated bag assembly 100 is curb-side or single-stream recyclable, the user may be more likely to recycle the insulated bag assembly 100 due to the ease of curb-side collection.

A method for assembling an insulated bag 110 can comprise folding a first main panel 112 of a pair of opposing main panels 112 relative to a first side panel 114 of a pair of opposing side panels 114 about a main crease line 122. The main panels 112, the side panels 114, and the main crease line 122 can be defined in an insulated blank 111. The insulated blank 111 can comprise an insulation batt 220, a first sheet 132, and a second sheet 134. The insulation batt 220 can be encapsulated in a blank cavity 221 defined between the first sheet 132 and the second sheet 134. A blank border 440 can extend around a perimeter of the insulated blank 111. The blank border 440 can be defined by a perimeter portion of the first sheet 132 being in facing engagement with a perimeter portion of the second sheet 134. The blank border 440 can encompass the blank cavity 221 and define an insulated portion of the insulated blank 111. The insulated blank 111 can define a first end 124 and a second end 125. The first end 124 can be disposed opposite from the second end 125.

The first end 124 can be attached to the second end 125 which can form a bag body 101. The first end 124 can be attached to the second end 125 by forming a main seam 120 between a one of the main panels 112 and a one of the side panels 114. The bag body 101 can be defined by the main panels 112 and the side panels 114. The bag body 101 can define a rectangular cross-sectional shape. A bottom panel 201 of the insulated bag 110 can be formed by folding a portion of the bottom panel 201 relative to the main panel 112 about a bottom crease line 441. The portion of the bottom panel 201 can be a bottom subpanel 202. The bottom panel 201 can comprise a pair of bottom subpanels 202. Each bottom subpanel 202 can be attached to a different one of the main panels 112. Forming the bottom panel 201 can comprise attaching a first bottom subpanel of the pair of bottom subpanels 202 to a second bottom subpanel of the pair of bottom subpanels 202. The bottom panel 201 and the bottom crease line 441 can be defined by the insulated blank 111.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A method for assembling an insulated bag comprising:
   folding a first main panel of a pair of opposing main panels relative to a first side panel of a pair of opposing side panels about a main crease line, the main panels, the side panels, and the main crease line defined in an insulated blank, the insulated blank comprising an insulation batt, a first sheet, and a second sheet, the insulation batt encapsulated in a blank cavity defined between the first sheet and the second sheet, a blank border extending around a perimeter of the insulated blank, the blank border defined by a perimeter portion of the first sheet being in facing engagement with a perimeter portion of the second sheet, the blank border encompassing the blank cavity and defining an insulated portion of the insulated blank, the insulated blank defining a first end and a second end, the first end disposed opposite from the second end;
   attaching the first end to the second end;
   forming a bottom panel of the insulated bag by folding a portion of the bottom panel relative to the main panel about a bottom crease line, the bottom panel and the bottom crease line further defined by the insulated blank;
   folding a wing about a base wing crease line towards the first side panel, the base wing crease line defined at an intersection of the wing and the first side panel; and
   attaching the wing to the first side panel.

2. The method of claim 1, wherein attaching the first end to the second end forms a bag body, wherein the bag body is defined by the main panels and the side panels, and wherein the bag body defines a rectangular cross-section.

3. The method of claim 1, wherein the bottom panel comprises a pair of bottom subpanels, wherein each bottom subpanel is attached to a different one of the main panels, and wherein forming the bottom panel further comprises attaching a first bottom subpanel of the pair of bottom subpanels to a second bottom subpanel of the pair of bottom subpanels.

4. The method of claim 1, wherein attaching the first end to the second end further comprises forming a main seam between a one of the main panels and a one of the side panels.

5. The method of claim 1, wherein:
   the bottom panel comprises four bottom flaps;
   each of a first pair of the four bottom flaps is attached to a different one of the side panels;
   each of a second pair of the four bottom flaps is attached to a different one of the main panels; and forming the bottom panel further comprises overlapping a first bottom flap of the first pair of bottom flaps with a first bottom flap of the second pair of bottom flaps.

6. The method of claim 1, wherein forming the bottom panel of the insulated bag comprises forming a bottom seam by attaching a first portion of a bottom border to a second portion of the bottom border, the blank border comprising the bottom border.

7. The method of claim 6, wherein forming the bottom seam comprises attaching a first bottom subpanel to a second bottom subpanel, the first bottom subpanel defining the first portion of the bottom border, the second bottom subpanel defining the second portion of the bottom border.

8. The method of claim 7, wherein attaching the first bottom subpanel to the second bottom subpanel comprises folding the first bottom subpanel relative to the first main panel, the first bottom subpanel attached to the first main panel.

9. The method of claim 1, further comprising sealing a bag opening of the insulated bag, the bag opening defined opposite from the bottom panel.

10. The method of claim 9, wherein sealing the bag opening comprises inserting an insulated panel into the bag opening.

11. The method of claim 10, further comprising positioning a panel beveled edge of the insulated panel against a bag beveled edge of the insulated bag.

12. The method of claim 10, further comprising contacting a panel border of the insulated panel with an inner surface defined by the first sheet, the inner surface defining a bag cavity within the insulated bag, the bag cavity extending inwards into the insulated bag from the bag opening towards the bottom panel.

13. The method of claim 9, wherein sealing the bag opening comprises rolling an uninsulated bag lip to form a seal, the uninsulated bag lip defined by the blank border, the blank border extending around the bag opening.

14. The method of claim 9, wherein sealing the bag opening comprises attaching opposing portions of an uninsulated bag lip together with an adhesive strip to form a seal, the uninsulated bag lip defined by the blank border, the blank border extending around the bag opening.

* * * * *